(12) United States Patent
Kumar et al.

(10) Patent No.: US 10,848,559 B2
(45) Date of Patent: Nov. 24, 2020

(54) MALWARE SCAN STATUS DETERMINATION FOR NETWORK-ATTACHED STORAGE SYSTEMS

(71) Applicant: EMC IP Holding Company LLC, Hopkinton, MA (US)

(72) Inventors: Shiv Shankar Kumar, Pune (IN); Jai Prakash Gahlot, Pune (IN); Amit Kumar Chauhan, Pune (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 273 days.

(21) Appl. No.: 15/968,321

(22) Filed: May 1, 2018

(65) Prior Publication Data
US 2019/0340359 A1    Nov. 7, 2019

(51) Int. Cl.
*H04L 29/08* (2006.01)
*G06F 21/56* (2013.01)
*G06F 16/174* (2019.01)

(52) U.S. Cl.
CPC ...... *H04L 67/1097* (2013.01); *G06F 16/1748* (2019.01); *G06F 21/562* (2013.01); *G06F 21/567* (2013.01); *G06F 2221/034* (2013.01)

(58) Field of Classification Search
CPC ............. H04L 67/1097; G06F 16/1748; G06F 21/567; G06F 21/562; G06F 2221/034
See application file for complete search history.

(56) References Cited

U.S. PATENT DOCUMENTS

| | | | | |
|---|---|---|---|---|
| 8,302,192 | B1* | 10/2012 | Cnudde | G06F 11/30 726/24 |
| 9,424,058 | B1* | 8/2016 | Wasson | G06F 9/455 |
| 2002/0174349 | A1* | 11/2002 | Wolff | G06F 21/565 713/188 |
| 2005/0131900 | A1* | 6/2005 | Palliyll | G06F 16/9014 |
| 2008/0243879 | A1* | 10/2008 | Gokhale | G06F 3/0638 |
| 2009/0164529 | A1* | 6/2009 | McCain | G06F 11/1464 |
| 2010/0083003 | A1* | 4/2010 | Spackman | H04L 9/0643 713/193 |
| 2010/0138924 | A1* | 6/2010 | Heim | G06F 21/566 726/24 |
| 2010/0306176 | A1* | 12/2010 | Johnson | G06F 16/125 707/664 |

(Continued)

*Primary Examiner* — Robert B Leung
(74) *Attorney, Agent, or Firm* — Amin, Turocy & Watson, LLP

(57) ABSTRACT

Malware scan status determination for network-attached storage systems is provided herein. A data storage system as described herein can include a memory that stores computer executable components and a processor that executes computer executable components stored in the memory. The computer executable components can include a data creation component that creates a scan status data structure associated with a network-attached storage (NAS) device, the scan status data structure comprising respective records that indicate a file identifier and a malware scan status for respective files stored on the NAS device, and a data update component that updates a record in the scan status data structure corresponding to a target file stored on the NAS device in response to receiving a malware scan result for the target file.

20 Claims, 19 Drawing Sheets

(56) References Cited

U.S. PATENT DOCUMENTS

| | | | | |
|---|---|---|---|---|
| 2012/0159175 A1* | 6/2012 | Yocom-Piatt | ....... | G06F 11/1453 713/176 |
| 2014/0281486 A1* | 9/2014 | Nayshtut | ................. | G06F 21/60 713/153 |
| 2015/0154398 A1* | 6/2015 | Jones | .................... | G06F 21/561 726/24 |
| 2017/0140157 A1* | 5/2017 | Gardner | ............. | G06F 11/1464 |

* cited by examiner

500

| File Hash | Scan Status | Last Scan Time |
|---|---|---|
| h1 | Clean | 1521182553 |
| h2 | Infected | 1521162253 |
| h3 | Clean | 1521182450 |
| h4 | Clean | 1521162991 |
| h5 | Infected | 1521162256 |

FIG. 5

MALWARE SCAN STATUS DETERMINATION FOR NETWORK-ATTACHED STORAGE SYSTEMS

TECHNICAL FIELD

The subject application is related to data storage, and more particularly, to techniques for managing data security in a data storage system.

BACKGROUND

As computing technology has advanced over time, so too has the amount and scope of data that can be maintained and analyzed via computer systems. For instance, the ability to manage very large data sets, commonly known as big data, has led to significant advances in fields such as manufacturing, media, science, and e-commerce, among many others. Data storage systems, such as those utilized in network-attached storage (NAS) platforms, provide the means by which these large sets of data can be maintained in an efficient and reliable way. In addition to providing a means for storing data, an NAS platform can implement one or more data security and/or protection techniques to ensure the integrity of data stored on the platform. For instance, an NAS platform can perform and/or manage scanning of respective files stored on the platform for viruses or other forms of malware according to one or more scanning policies.

SUMMARY

The following summary is a general overview of various embodiments disclosed herein and is not intended to be exhaustive or limiting upon the disclosed embodiments. Embodiments are better understood upon consideration of the detailed description below in conjunction with the accompanying drawings and claims.

In an aspect, a data storage system is described herein. The data storage system includes a memory that stores computer executable components and a processor that executes computer executable components stored in the memory. The computer executable components can include a data creation component that creates a scan status data structure associated with a network-attached storage (NAS) device, the scan status data structure including respective records that indicate a file identifier and a malware scan status for respective files stored on the NAS device, and a data update component that updates a record in the scan status data structure corresponding to a target file stored on the NAS device in response to receiving a malware scan result for the target file.

In another aspect, a method is described herein. The method includes creating, by a device operatively coupled to a processor, a scan status data structure associated with an NAS device, the scan status data structure including respective records that indicate a file identifier and a malware scan status for respective files stored on the NAS device, and updating, by the device, a record in the scan status data structure corresponding to a target file stored on the NAS device in response to receiving a malware scan result for the target file.

In an additional aspect, a machine-readable storage medium is described herein. The machine-readable storage medium includes computer executable instructions that, when executed by a processor, facilitate performance of operations that can include creating a scan status data structure associated with an NAS device, the scan status data structure including respective records that indicate a file identifier and a malware scan status for respective files stored on the NAS device, and updating a record in the scan status data structure corresponding to a target file stored on the NAS device in response to receiving a malware scan result for the target file.

DESCRIPTION OF DRAWINGS

Various non-limiting embodiments of the subject disclosure are described with reference to the following figures, wherein like reference numerals refer to like parts throughout unless otherwise specified.

FIG. 5 is a diagram depicting an example data structure that can be utilized to store file history and/or scan status data in accordance with various aspects described herein.

DETAILED DESCRIPTION

Figure 1:
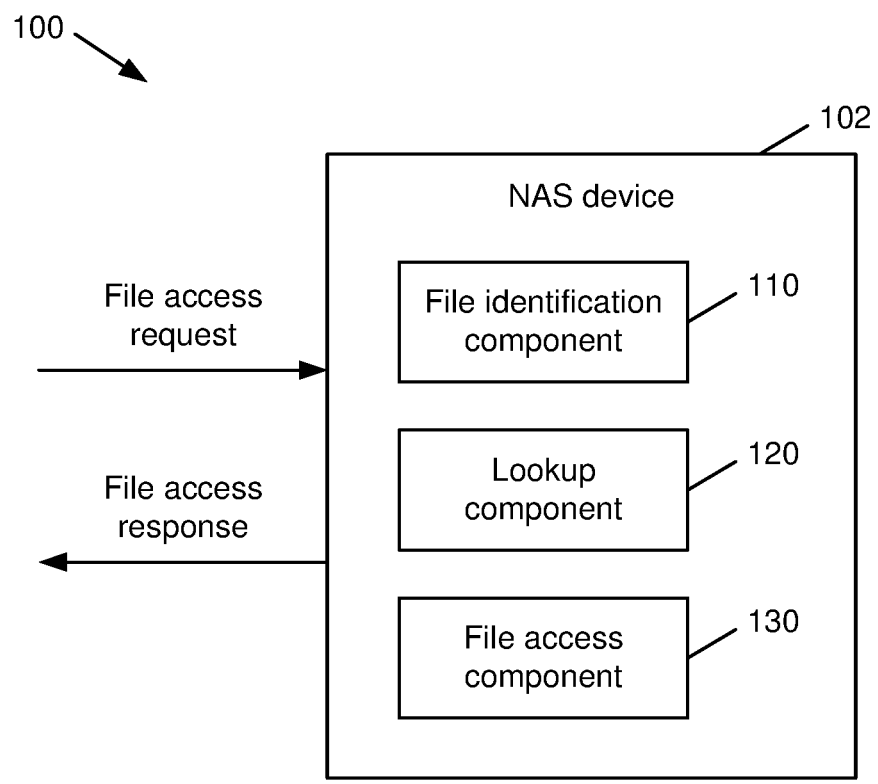
FIG. 1 is a block diagram of a system that facilitates efficient malware scanning for duplicate files in a data storage system in accordance with various aspects described herein.

Various specific details of the disclosed embodiments are provided in the description below. One skilled in the art will recognize, however, that the techniques described herein can in some cases be practiced without one or more of the specific details, or with other methods, components, materials, etc. In other instances, well-known structures, materials, or operations are not shown or described in detail to avoid obscuring certain aspects.

In an aspect, a network-attached storage (NAS) platform can serve as a storage environment for unstructured data, which can provide a functionally unlimited amount of storage space for multiple users via a seamless single volume and a single file system. As this single volume and file system can host a large number of shares and user directories with different access privileges, in some cases certain files stored by an NAS system can be duplicates of other files stored in the system.

Additionally, an unstructured data storage system, such as an NAS system, can operate in combination with an external antivirus server (AVS) in order to prevent files infected with viruses or other malware from entering or residing in storage. For instance, files stored and/or accessed in an NAS system can be scanned (e.g., in real time, according to a schedule or direct administrative command, etc.) for viruses or other malware by an external AVS. Process flows by which this procedure can be conducted are described in further detail below.

In an NAS system, it is desirable to implement malware scanning and/or other similar operations in a time-efficient manner. For instance, time efficiency can be of particular concern in environments such as finance, healthcare, or the like. Further, environments such as media and/or entertainment can in some cases be associated with a large number of duplicate files of large size, such as high-definition audio and/or video files. As malware scan times can in some cases be proportional to file size, malware scan times for such files can be significant in length.

Various data storage services (e.g., cloud-based storage, on-premises storage, etc.) can utilize one or more deduplication techniques to reduce the number of duplicate files by performing operations such as file-level and/or block-level deduplication on the stored data. Such deduplication operations can, for instance, replace multiple instances of identical files in a system with pointers or other references to a single instance of the file, thereby saving storage space associated with storing redundant instances of the same file. However, while deduplication can aid in reducing utilized storage space, conventional malware scanning techniques result in each instance of a file being scanned, e.g., by a remote AVS. In contrast, various embodiments described herein can provide techniques by which the scanning of multiple instances of the same file can be avoided.

Various embodiments described herein can provide one or more benefits that improve the functionality of an NAS system and/or an associated AVS. A non-exhaustive list of such benefits is as follows. The amount of data sent to a remote AVS for file scanning can be reduced, thereby reducing utilized network bandwidth and/or other communication resources. Delays experienced by a client associated with malware scans for requested files can be reduced. AVS throughput can be increased. Computing cycles utilized by the AVS and/or NAS system for processing files can be reduced. Power consumption by the AVS and/or NAS system in association with performing malware scans can be reduced. Other benefits that result in improvements to the operation of an NAS system and/or an associated AVS are also possible.

With reference now to the drawings, FIG. 1 illustrates a system 100 that facilitates efficient malware scanning for duplicate files in a data storage system in accordance with various aspects described herein. In an aspect, system 100 can be, or can be implemented as part of, a network-attached storage (NAS) platform and/or other computing platforms on which data sets of varying scope and/or size are desirably stored. As shown in FIG. 1, system 100 can include an NAS device 102, which can be and/or implement the functionality of one or more computing devices (nodes) comprising a memory and at least one processor. Also or alternatively, the NAS device 102 can include one or more data storage devices such as individual data drives or logical and/or physical groups of drives. Logical groups of data drives can include Redundant Array of Independent Disks (RAID) arrays and/or any other groups of hard drives that are logically coupled in any suitable manner. Physical groups of drives can include drive racks, sleds, and/or any other physical grouping of data drives. While the NAS device 102 is shown as a single computing device in FIG. 1 for simplicity of illustration, it should be appreciated that the NAS device 102 could be a single physical device and/or implemented among multiple communicatively coupled devices.

As further shown in FIG. 1, the NAS device 102 includes computer executable components, namely a file identification component 110, a lookup component 120, and a file access component 130. Operation of the components 110, 120, 130 is described in further detail below. In an aspect, the components 110, 120, 130, as well as respective components illustrated and described below with respect to the drawings that follow, can be implemented in hardware, software, and/or a combination of hardware and software. For instance, a memory (not shown) of the NAS device 102 can store the components 110, 120, 130, and a processor (not shown) of the NAS device 102 can execute the components 110, 120, 130 as stored by the memory. Other implementations are also possible.

In an aspect, the file identification component 110 can obtain an identifier for a target file stored by system 100, e.g., stored on the NAS device 102 and/or one or more storage devices operatively coupled to the NAS device 102. The target file can be any suitable file stored and/or otherwise associated with system 100, such as a file that is requested for access (e.g., read access, write access, etc.) by a client, user, and/or other requesting entity. Additionally, the identifier for the target file can be any suitable information that uniquely identifies the target file, e.g., the result of a hash performed with respect to the target file.

The lookup component 120 can search and/or query a scan status data structure for a malware scan result corresponding to the target file. In an aspect, the scan status data structure can include information arranged in any suitable manner (e.g., as a database, a table, a list or linked list, a binary tree, etc.). Further the information stored in the scan status table can store data relating to malware scan results for respective files associated with system 100 and/or additional information, such as file deduplication data, file history data, or the like. Techniques for construction and/or maintenance of a scan status data structure are described in further detail below.

As further shown in FIG. 1, the file access component 130 can grant access to the target file in response to lookup component 120 obtaining the malware scan result from the scan status data structure and the malware scan result indicating that the target file contains no malware. In doing so, the file access component 130 can provide mechanisms by which a first file having the same contents as a second, previously scanned file is not scanned by the AVS. Instead, the client can directly be given access to the first file based on the scan result of the second file. As a result, redundant malware scans for duplicate files can be avoided without sacrificing the level of malware protection available to the system. Avoidance of duplicate scans can, in turn, reduce user wait times, resulting in an improved user experience. Also or alternatively, avoiding duplicate scans can reduce an amount of computing resources utilized by the AVS, thereby increasing AVS throughput.

Figure 2:
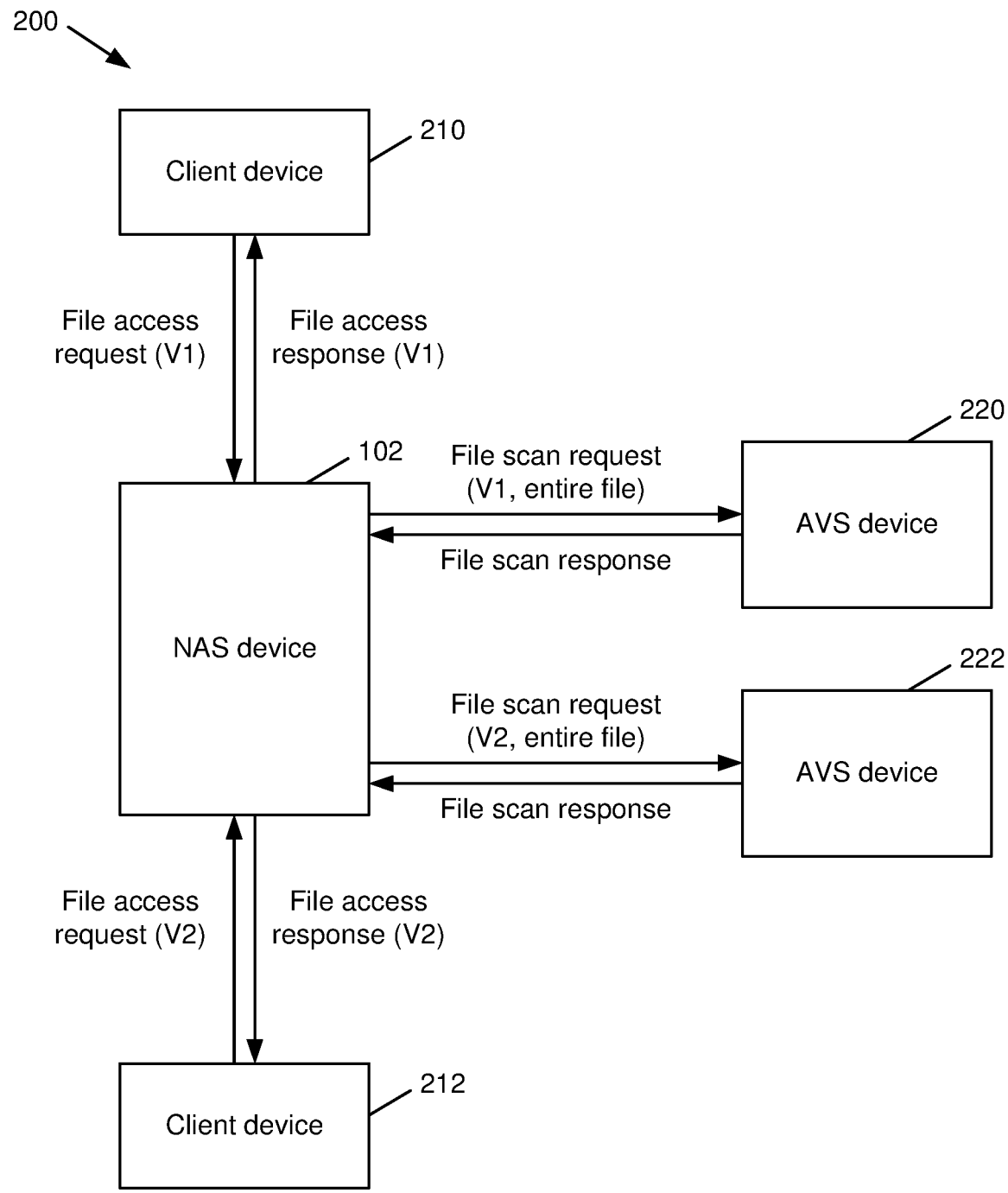
FIGS. 2-3 are diagrams depicting respective example malware scan messaging flows between respective components of a data storage system in accordance with various aspects described herein.

Turning now to FIG. 2, an example malware scan messaging flow between respective components of a data storage system is illustrated by diagram 200. Repetitive descriptions of like parts described in previous embodiments herein is omitted for the sake of brevity. As shown by diagram 200, a first file and/or version of a file, denoted in diagram 200 as V1, is requested by a client device 210 from storage associated with an NAS device 102. In response to this request, the NAS device 102 submits a file scan request to an associated AVS device 220 to determine whether viruses or other malware are present in the requested file.

In an aspect, the NAS device 102 can initiate a file scan request according to one or more communication protocols generally known in the art. For instance, the NAS device 102 can initiate a file scan via the Internet Content Adaptation Protocol (ICAP) by sending the file to be scanned in its entirety to the AVS device 220 along with the file scan request. Also or alternatively, the NAS device 102 can initiate the file scan using a Common AntiVirus Agent (CAVA), in which the AVS device 220 can access a file to be scanned over the Server Message Block (SMB) protocol and/or other suitable protocols. Other techniques are also possible. Irrespective of the protocol(s) utilized to initiate the malware scan, the AVS device 220 can report the status of the malware scan back to the NAS device 102 in a file scan response following completion of the malware scan.

The NAS device 102 can, in turn, provide a file access response to the requesting client device 210 that allows or denies access to the requested file based on the outcome of the malware scan by the AVS device 220. For instance, the NAS device 102 (e.g., via the file access component 130 shown in FIG. 1) can deny access to a requested target file in response to a malware scan result returned by the AVS device 220 indicating that the target file contains malware. Conversely, the NAS device 102 can grant access to the target file if the malware scan result indicates that the target file is free of malware.

As additionally shown by FIG. 2, a second client device 212 can subsequently submit an access request to the NAS device 102 for another file and/or a version of a file, denoted here as V2. In response to the file access request, the NAS device 102 can initiate a malware scan for file V2 at the same AVS device 220 that performed the malware scan for file V1 or a different AVS device 222 in a similar manner to that described above with respect to file V1. However, in the event that file V2 is a duplicate of file V1, e.g., files V1 and V2 are substantially identical in content, the NAS device 102 can incur unnecessary computing overhead by submitting a file scan request for file V2 after a malware scan for file V1 has been completed due to having no knowledge of the scan status of respective files associated with the NAS device 102. As a result, a considerable delay can be experienced by the client device 212 before being granted access to its requested file. Further, in the event that the NAS device 102 initiates malware scans via ICAP, the redundant malware scan of file V2 causes the entirety of file V2 to be transferred to the AVS device 222.

Figure 3:
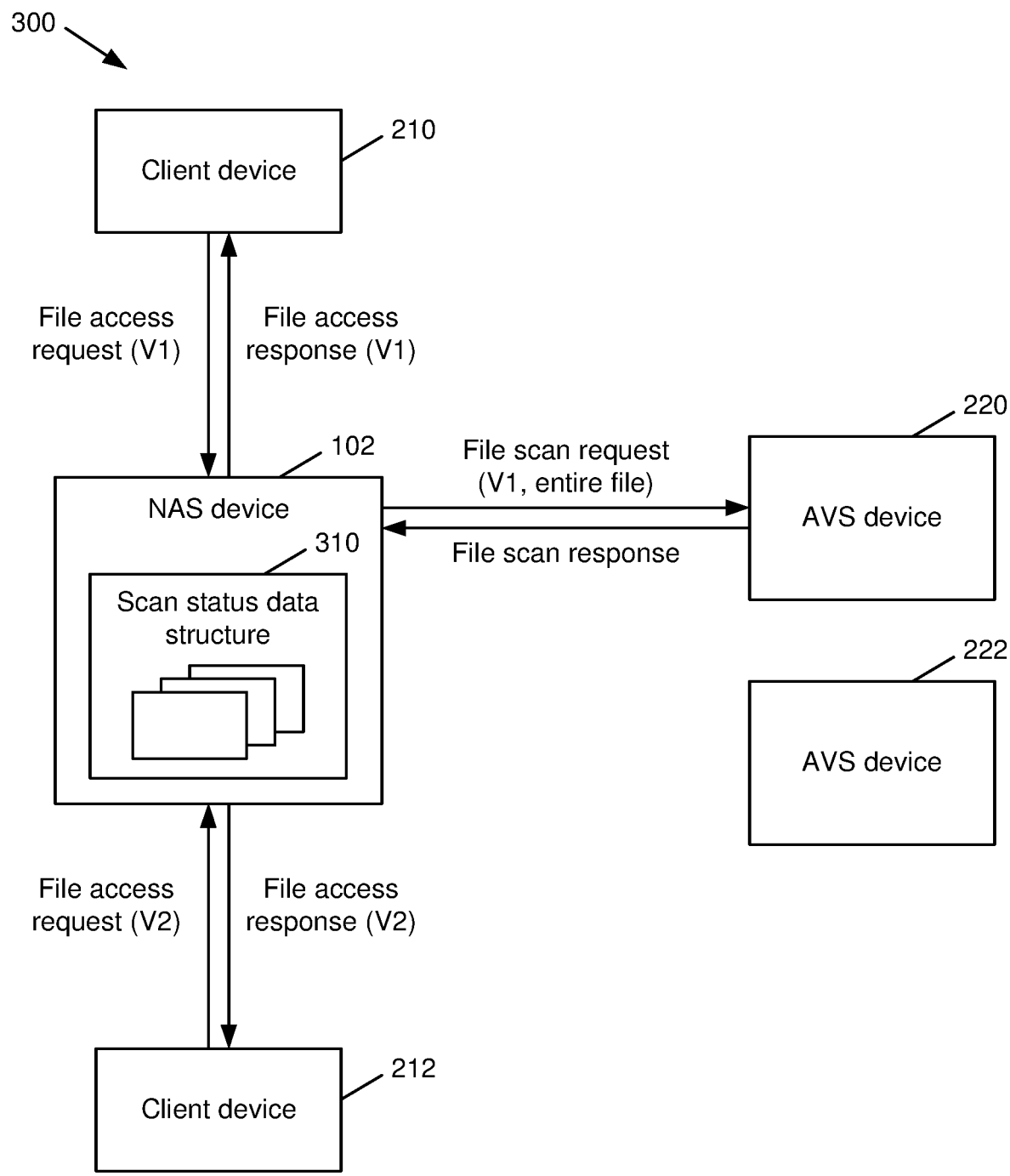

In contrast, as shown by diagram 300 in FIG. 3, an NAS device 102 in accordance with various aspects described herein can maintain a scan status data structure 310 that contains relationships between files associated with the NAS device 102, as identified by file hashes and/or other unique file identifiers, to status information associated with previously conducted malware scans of the respective files. Accordingly, in the event that a client device 212 submits a file access request to the NAS device 102 for a file V2 that is a duplicate of a previously scanned file V1, the NAS device 102 can return the scan status for file V1 as stored in the scan status data structure 310 without submitting a redundant malware scan request to an AVS device 220 and/or 222. As a result, access to file V2 at the client device 212 can be allowed or denied by the NAS device 102 in a shorter timeframe, and with reduced computing resource usage, than in the procedure illustrated by diagram 200.

Figure 4:
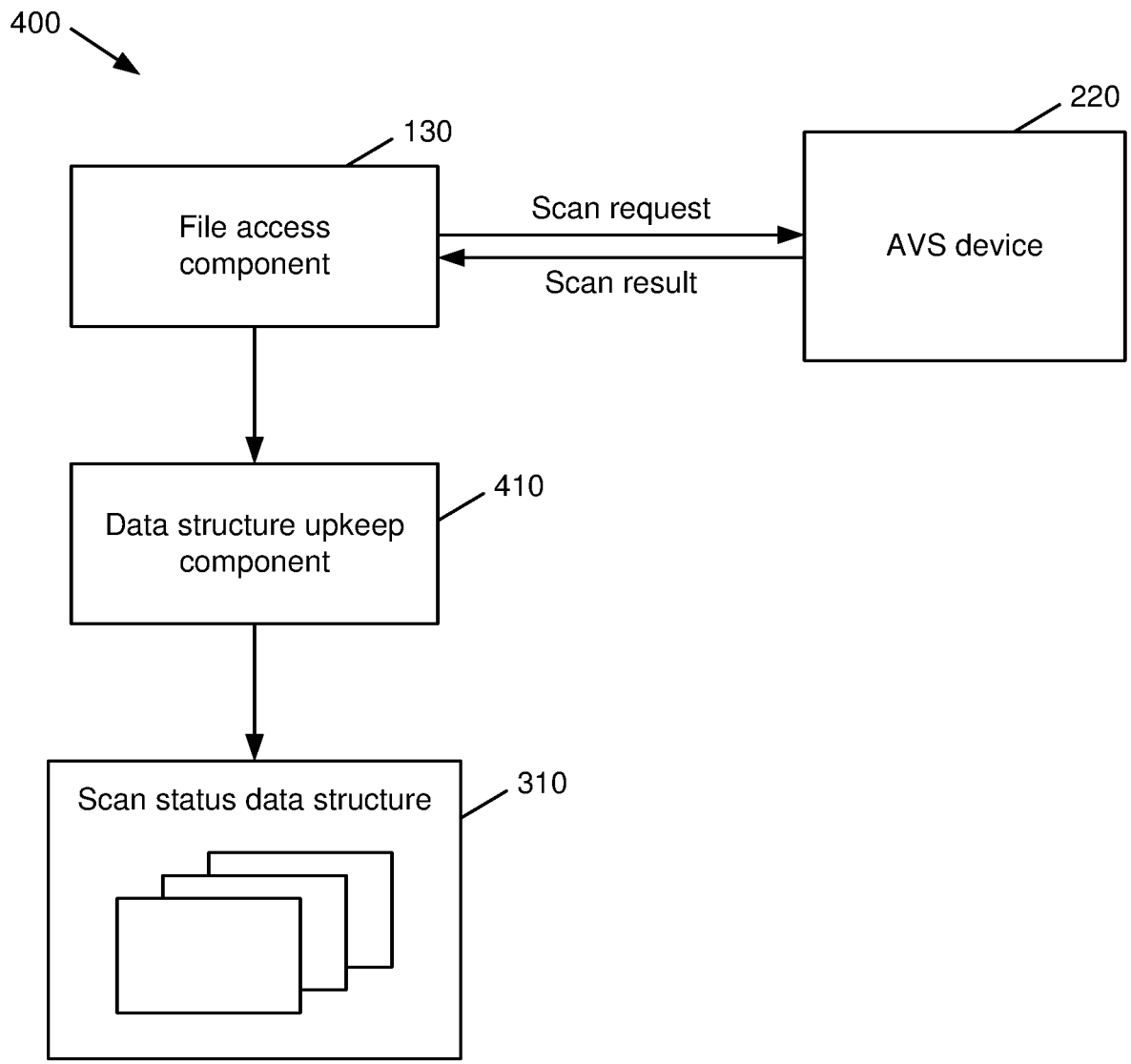
FIG. 4 is a block diagram of a system that facilitates updating a data structure comprising file history and/or scan status data in accordance with various aspects described here.

Referring next to FIG. 4, a system 400 that facilitates updating a data structure 310 comprising file history and/or scan status data is illustrated. Repetitive descriptions of like parts described in previous embodiments herein is omitted for the sake of brevity. As shown by FIG. 4, system 400 includes a file access component 130 that can receive a request for a target file as described above with respect to FIGS. 2-3. In response to receiving the request, the file access component can determine whether a malware scan result previously exists in the scan status data structure 310 for a file having the same identifier or other information as the target file. In response to a malware scan result corresponding to the identifier for the target file being determined not to be in the scan status data structure 310, the file access component 130 can initiate a scan of the target file at an AVS device 220 as described above with respect to FIGS. 2-3. Upon receiving a malware scan result from the AVS device 220, a data structure upkeep component 410 can record a relationship between the identifier for the target file and the scan of the target file by the AVS device 220 in the scan status data structure 310.

Diagram 500 in FIG. 5 illustrates a specific, non-limiting example format that can be utilized for the scan status data structure 310 in accordance with various aspects described herein. It should be appreciated that the data structure format illustrated by diagram 500 is merely one example of a format that could be utilized, and other formats could also be used without departing from the scope of the description and the claimed subject matter.

In an aspect, diagram 500 illustrates a File Hash and Scan Status Table (FHSST) format that can be utilized, e.g., by the data structure upkeep component 410, to generate and/or maintain the scan status data structure 310. As shown by diagram 500, the FHSST can contain records corresponding to respective files stored by a corresponding NAS system. Here, the primary key of the FHSST is a file hash field, which can be generated for respective files using a function $f(x)$ that uniquely identifies respective files in order to determine the presence of duplicate files. The file hash for a given file as used herein can be generated using any suitable hashing algorithms as known in the art, such as the XXH64 and/or XXH32 algorithms or any other suitable algorithm or combination thereof. Also or alternatively, the file hash for a given file can be obtained from existing file system deduplication metadata and/or other similar information previously stored on the corresponding NAS system.

While diagram 500 illustrates a set of files indexed by their respective file hashes, it should be appreciated that a primary key for the scan status data structure 310 can be generated in any suitable manner, and other key types could also be used. It should further be appreciated that, unless explicitly stated otherwise, the term "hash" or "file hash" as used in this description is intended to encompass any information, generated in any manner, that is suitable to uniquely identify a file stored on a file system.

In an aspect, the FHSST as shown by diagram 500 can be created as an empty table, i.e., a table with zero records or one or more temporary (filler) records. As files are accessed in the system, the data structure upkeep component 410 and/or another suitable entity can determine whether the hashes for the respective files are present in the FHSST. If a given file hash is not present, the data structure upkeep component 410 can add a row in the FHSST corresponding to the file hash. The file access component 130 can then initiate a scan for the file at an AVS device 220 as generally described above, and the result of the scan can be saved in the row of the FHSST corresponding to the file hash. Alternatively, if a given file hash is already present in the FHSST, the file access component 130 can return the scan result given in the table, thereby bypassing a separate scan by the AVS device 220.

In an aspect, an FHSST and/or other scan status data structure 310 can be implemented as a separate structure and/or integrated with existing deduplication metadata. For instance, if a file deduplication facility is present and enabled in the systems, then the scan status attribute as shown by diagram 500 can be added to the existing deduplication metadata, thereby enabling the existing deduplication metadata structure to act as the scan status data structure 310. It should be appreciated that, unless explicitly stated otherwise, the scan status data structure 310 as described herein is intended to encompass both a standalone FHSST as well as scan status data integrated within a preexisting deduplication metadata structure.

Figure 6:
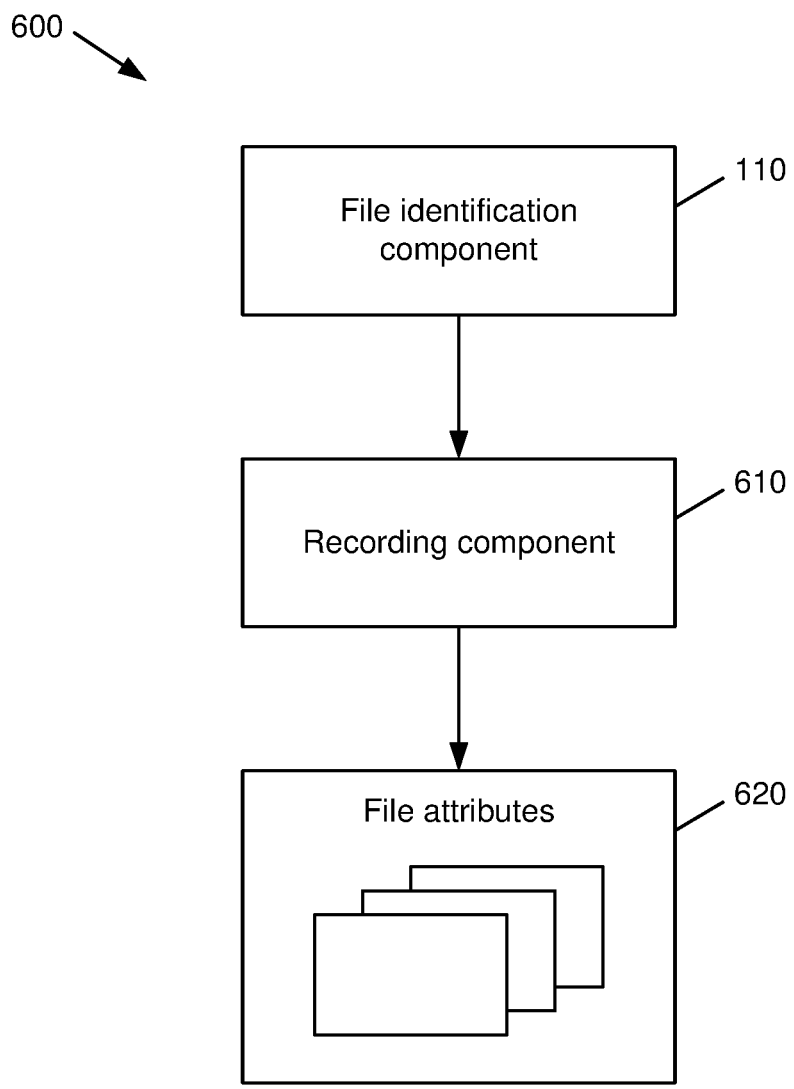
FIG. 6 is a block diagram of a system that facilitates recording of file history and/or scan status data with corresponding file attributes in accordance with various aspects described herein.

With reference now to FIG. 6, a system 600 that facilitates recording of file history and/or scan status data with corresponding file attributes is illustrated. Repetitive descriptions of like parts described in previous embodiments herein is omitted for the sake of brevity. As shown by FIG. 6, system 600 includes a file identification component 110 that obtains an identifier for a target file, such as a result of a file hash and/or any other suitable unique identifier as described herein, by analyzing attribute data corresponding to the target file. In an aspect, the file identification component 110 can analyze one or more attributes of the target file (e.g., as given in an extended file attribute) to determine whether the identifier is present in such attributes. In response to the identifier for the target file being determined not to be present in this attribute data, the file identification component 110 can create an appropriate identifier for the target file by performing a file hash and/or other operations.

As further shown in FIG. 6, system 600 additionally includes a recording component that can record the identifier for the target file as created by the file identification component 110 in file attribute data 620 corresponding to the target file in response to the identifier being created. In an aspect, by storing the identifier for a given file in attribute data 620 corresponding to the file in addition to a scan status data structure 310, system 600 can further reduce system overhead by preventing searches of the entire scan status data structure 310 for an identifier corresponding to a target file that has not yet been recorded in the scan status data structure 310.

In an aspect, the scan status data structure 310 as described above can be referenced in connection with respective file operations before and/or in parallel to sending a scan request to an AVS device 220 for a particular target file. In various examples, specific operation(s) performed with respect to the scan status data structure 310 can be based on the location of the scan status data structure 310 with respect to the system, network scan policies for the system as set by a system administrator and/or other entity, the type of access (e.g., read or write access) requested for a particular file, and/or other factors.

Various methods that facilitate network data security via the scan status data structure 310 for respective example use cases are described below with respect to FIGS. 7-10 and 14-15. It should be appreciated, however, that the methods described below are merely examples, and other methods could also be used. Further, it should be appreciated that, where appropriate, various acts associated with the methods described below can be performed by a computing device comprising at least one processor, e.g., an NAS device 102 in accordance with one or more aspects described above.

In an aspect, the scan status data structure 310 as described above can be referenced in connection with respective file operations before and/or in parallel to sending a scan request to an AVS device 220 for a particular target file. In various examples, specific operation(s) performed with respect to the scan status data structure 310 can be based on the location of the scan status data structure 310 with respect to the system, network scan policies for the system as set by a system administrator and/or other entity, the type of access (e.g., read or write access) requested for a particular file, and/or other factors.

Various methods that facilitate network data security via the scan status data structure 310 for respective example use cases are described below with respect to FIGS. 7-10 and 14-15. It should be appreciated, however, that the methods described below are merely examples, and other methods could also be used. Further, it should be appreciated that, where appropriate, various acts associated with the methods described below can be performed by a computing device comprising at least one processor, e.g., an NAS device 102 in accordance with one or more aspects described above.

With reference to FIGS. 7-10, flow diagrams of respective methods are provided that illustrate example process flows for a system in which a scan status data structure 310 resides on an NAS device 102, e.g., as shown by FIG. 3. In an aspect, the respective flow diagrams illustrate process flows for respective network scan policies and use cases, which will be described in further detail as follows.

Figure 7:
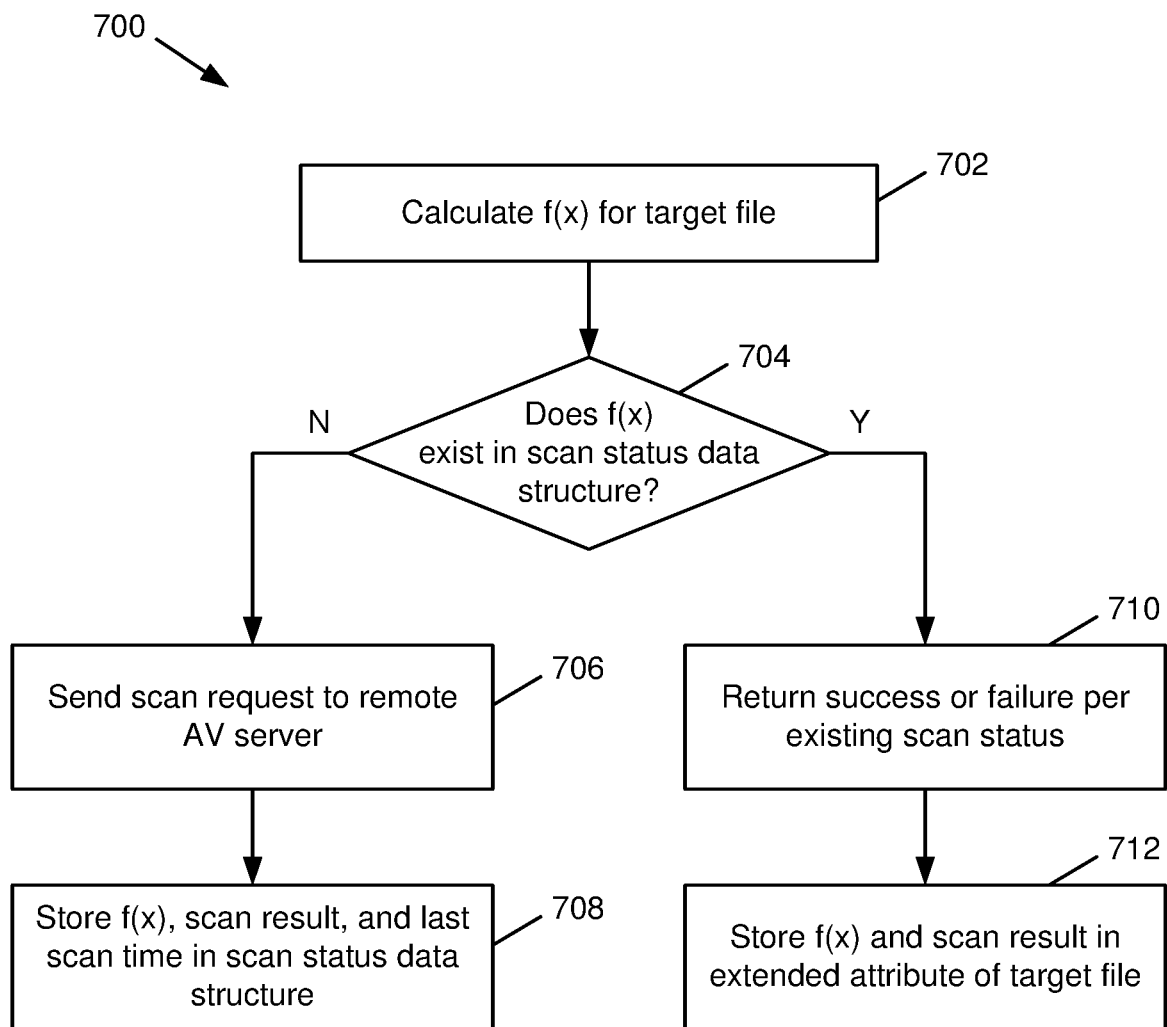
FIGS. 7-10 are flow diagrams of respective methods that facilitate data security in a data storage system in accordance with various aspects described herein.

Scan on File Write Policy, File Write Access Requested:

In the event of a network policy that specifies malware scans to be performed on file write access only (i.e., no scan on file read access), a process flow corresponding to requesting a file for write access is shown by method 700 in FIG. 7. A request for write access that can initiate performance of method 700 can include creation of a new file, modification of an existing file, renaming of an existing file, and/or any other operations that could result in creation and/or modification of a file.

Method 700 begins at 702, at which an identifier for a target file, here denoted as f(x), can be calculated (e.g., by a file identification component 110). As noted above, an identifier for a target file can be and/or include a result of a file hash and/or any other information suitable for uniquely identifying a file stored on a given file system.

At 704, a scan status data structure 310 can be consulted (e.g., by a lookup component 120) to determine whether the identifier f(x) is already present. If the identifier is not present in the scan status data structure 310, method 700 can proceed to 706, wherein a scan request is sent (e.g., by a file access component 130) to a remote AV server (e.g., AVS device 220). At 708, upon completion of the requested scan by the AV server, the identifier f(x) for the target file, the result of the scan, and the time of the scan can be recorded (e.g., by a data structure upkeep component 410) in the scan status data structure 310, e.g., in the manner shown by diagram 500, and/or pursuant to any other suitable format.

Returning to 704, if the identifier for the target file is present in the scan status data structure 310, method 700 instead proceeds to 710, at which a malware scan success or failure can be returned (e.g., by the file access component 130) based on the scan status provided in the scan status data structure 310. By returning an existing scan status for the file at 710, method 700 can result in reduced overhead associated with requesting a malware scan for a previously scanned file, as generally described above. Method 700 can then additionally proceed to 712, at which the identifier for the target file and the scan result from the scan status data structure 310 can be stored (e.g., by a recording component 610) in an extended attribute of the requested instance of the target file (e.g., the file attributes 620 for the target file).

Scan on File Write Policy, File Read Access Requested:

In the event of a network policy that specifies malware scans to be performed on file write access only (i.e., no scan on file read access), malware scanning can be omitted in response to a request for file read access per the policy.

Scan on File Read/Open and File Write Policy, File Write Access Requested:

In the event of a network policy that specifies malware scans to be performed on both file read and file write access, a process flow corresponding to requesting a file for write access can be similar to that described above with respect to FIG. 7.

Figure 8:
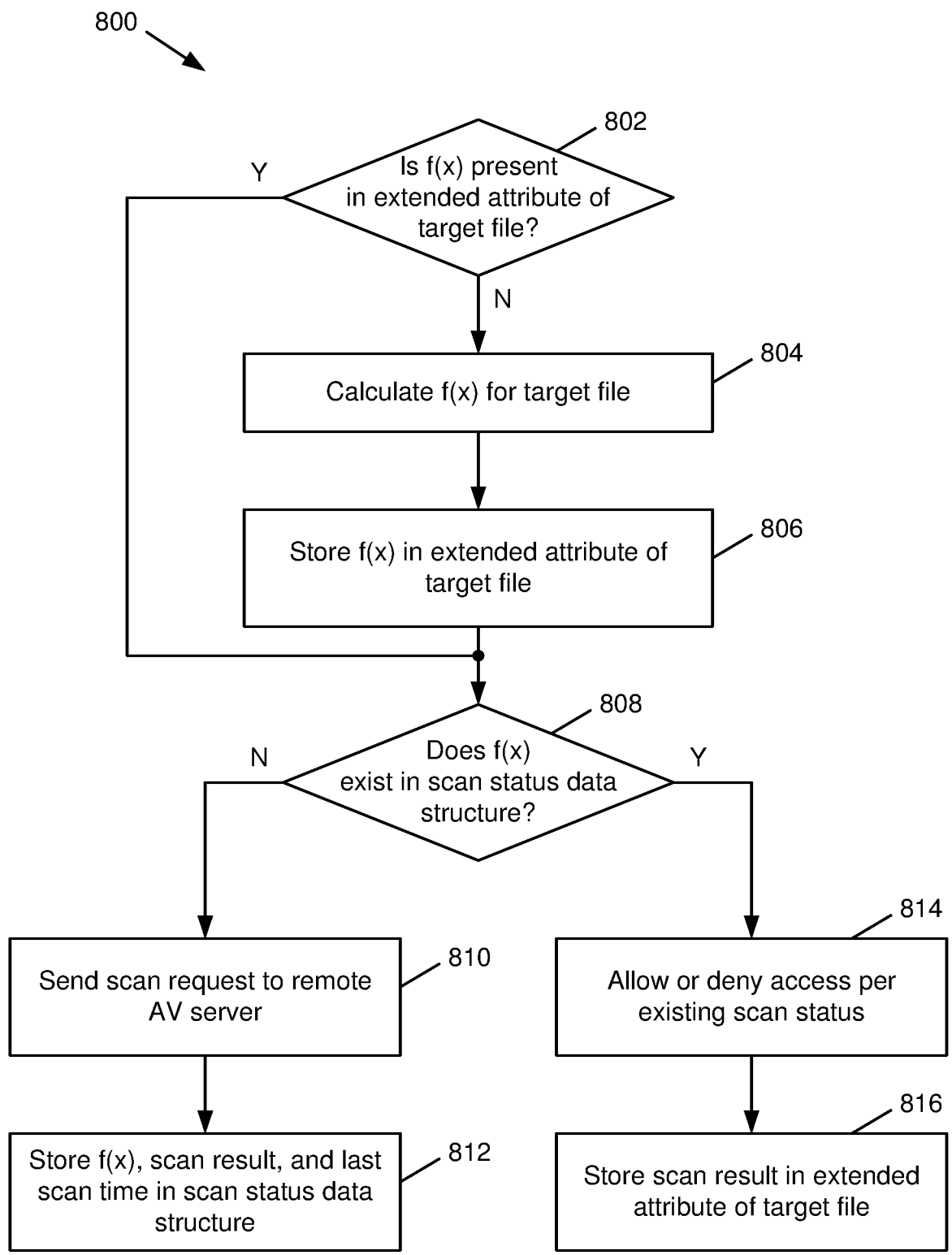

Scan on File Read/Open and File Write Policy, File Read Access Requested:

In the event of a network policy that specifies malware scans to be performed on both file read and file write access, a process flow corresponding to requesting a file for read access is shown by method 800 in FIG. 8. A request for read access that can initiate performance of method 800 can include opening and/or otherwise accessing a file in order to read or otherwise obtain contents of the file.

Method 800 begins at 802, at which an NAS device (e.g., NAS device 102) can determine (e.g., via a file identification component 110) whether an identifier f(x) for a target file is present in an extended attribute of the target file (e.g., the file attributes 620 for the target file). If the identifier is present, method 800 can proceed to 808 as described below. If the identifier is not present, method 800 can instead proceed to 804, at which the identifier f(x) for the target file can be calculated (e.g., by the file identification component 110). Once calculated, the identifier can be stored (e.g., by a recording component 610) in the extended attribute of the target file at 806.

At 808, the NAS device (e.g., via the file identification component 110) can further determine whether the identifier f(x) for the target file is present in the scan status data structure 310. If the identifier is not present in the scan status data structure 310, method 800 can proceed to 810, wherein a scan request is sent (e.g., by a file access component 130) to a remote AV server (e.g., AVS device 220). At 812, upon completion of the requested scan by the AV server, the identifier f(x) for the target file, the result of the scan, and the time of the scan can be recorded (e.g., by a data structure upkeep component 410) in the scan status data structure 310, e.g., in the manner shown by diagram 500, and/or pursuant to any other suitable format.

Otherwise, if the identifier for the target file is present in the scan status data structure 310, method 800 can proceed from 808 to 814, at which a malware scan success or failure can be returned (e.g., by the file access component 130) based on the scan status provided in the scan status data structure 310. Method 800 can then additionally proceed to 816, at which the scan result from the scan status data structure 310 can be stored (e.g., by the recording component 610) in an extended attribute of the requested instance of the target file (e.g., the file attributes 620 for the target file).

Figure 9:
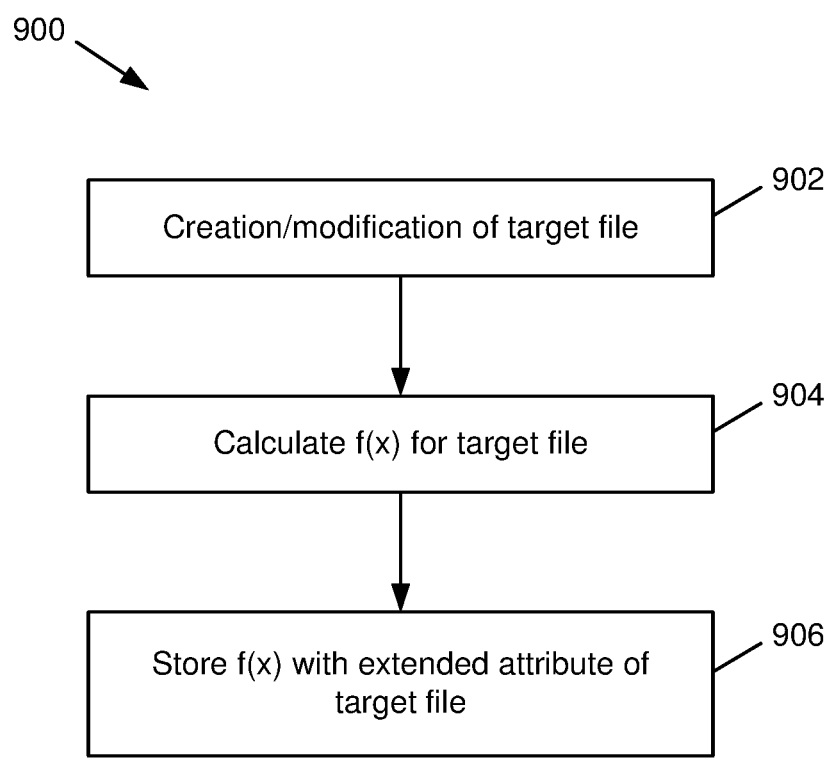

Scan on File Open Policy, File Write Access Requested:

In the event of a network policy that specifies malware scans to be performed on opening a file, e.g., as opposed to on requesting read access or write access, a process flow corresponding to requesting a file for read access is shown by method 900 in FIG. 9.

In an aspect, method 900 can be initiated on creation, modification, renaming, and/or other modifications to a target file, as shown at 902. At 904, in response to the initiating event at 902, an identifier f(x) for the target file can be calculated (e.g., by the file identification component 110). Subsequently, in response to creation of the target file, the identifier f(x) for the target file can be stored (e.g., by the recording component 610) in the extended attribute of the target file (e.g., the file attributes 620 for the target file) at 906.

In an aspect, the operations described above with respect to method 900 can be performed for a system in which virus and/or malware scanning is enabled. In another aspect, whether method 900 is performed at a given NAS device 102 can depend on one or more protocols utilized by the NAS device 102, e.g., ICAP, and/or other factors. With regard to method 900, it can be noted that the actions of method 900 as described above can be performed without lookup or storage to the scan status data structure 310. Use of the scan status data structure 310 can be initiated in the case of this network policy in response to a scan for a target file being requested.

Scan on File Open Policy, File Read Access Requested:

In the event of a network policy that specifies malware scans to be performed on opening a file, a process flow corresponding to requesting a file for read access can be similar to that described above with respect to FIG. 8.

Scheduled Malware Scan Policy:

In the event of a network policy that specifies a schedule on which malware scans for respective files stored on the network are to be performed, a process flow for performing these scheduled scans can be similar to that described above with respect to FIG. 8.

Forced Malware Scan Policy:

In the event of a forced malware scan of one or more files stored on the network, e.g., a malware scan directly initiated by a system administrator and/or another entity with sufficient network privileges to initiate a malware scan, respective files on the network can be scanned without referring to the scan status data structure 310. In an aspect, the scan status data structure 310 and/or the file attributes 620 for respective files can be updated with the results of respective malware scans performed in accordance with this policy.

Figure 10:
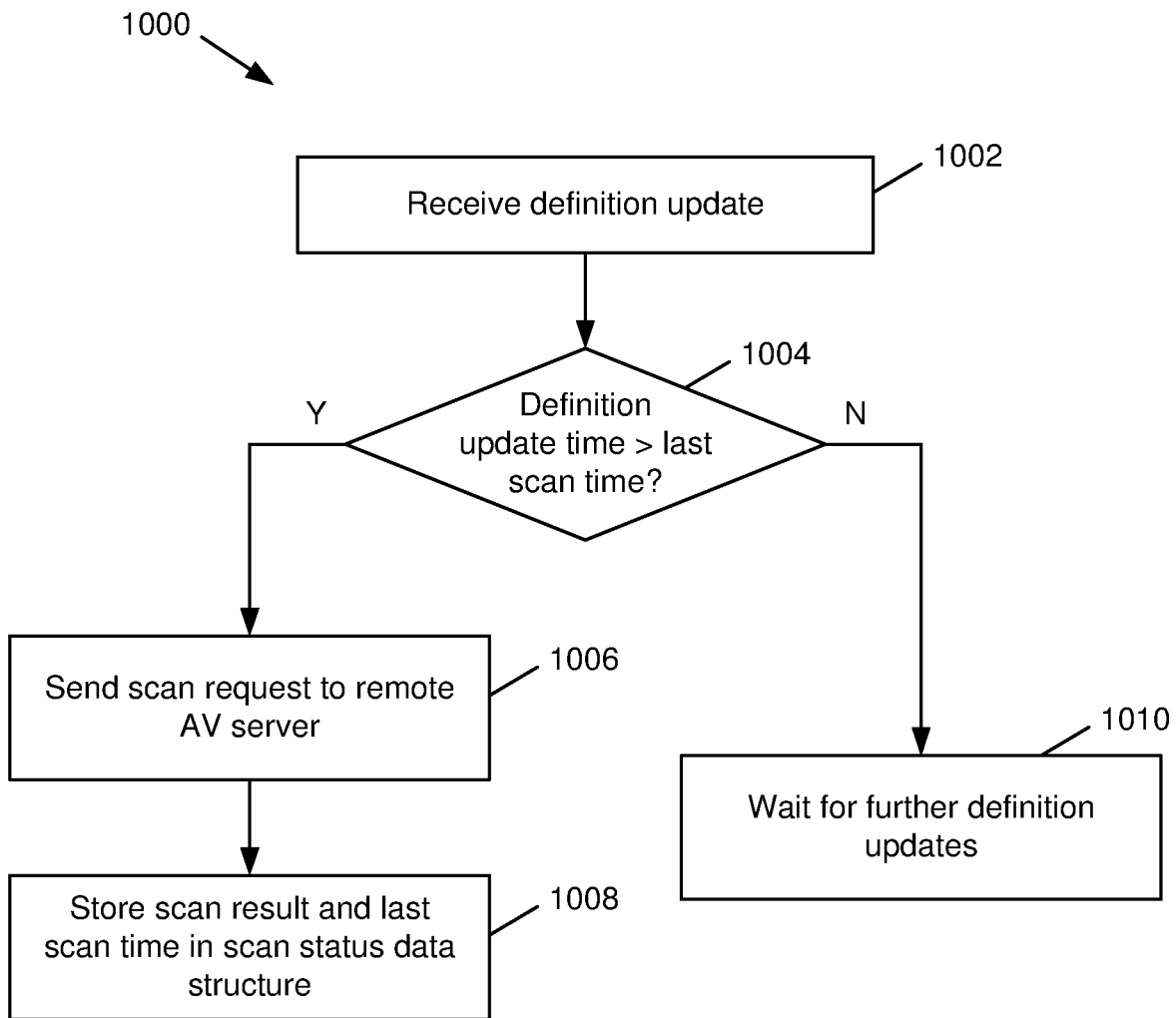

Scan on Malware Definitions Update Policy:

In the event of a network policy that specifies malware scans to be performed on receiving updated malware definition updates, a process flow for conducting malware scans is shown by method 1000 in FIG. 10. In an aspect, method 1000 can be initialized at 1002 in response to receiving a malware definition update. At 1004, a device performing method 1000 can determine (e.g., via a file access component 130 and/or another suitable component or combination thereof) whether a time associated with the definition update received at 1002 is greater (i.e., newer) than a last scan time associated with respective files stored on the network. If the definitions are newer than the last scan time, method 1000 can proceed to 1006, wherein a scan request for respective files can be submitted (e.g., by a file access component) to a remote AV server such as an AVS device 220. Next, at 1008, the scan result and corresponding scan time for respective files can be stored (e.g., by the data structure upkeep component 410) in the scan status data structure 310. Alternatively, if the definition update is not newer than the last scan time, method 1000 can proceed from 1004 to 1010 to await further definition updates.

Figure 11:
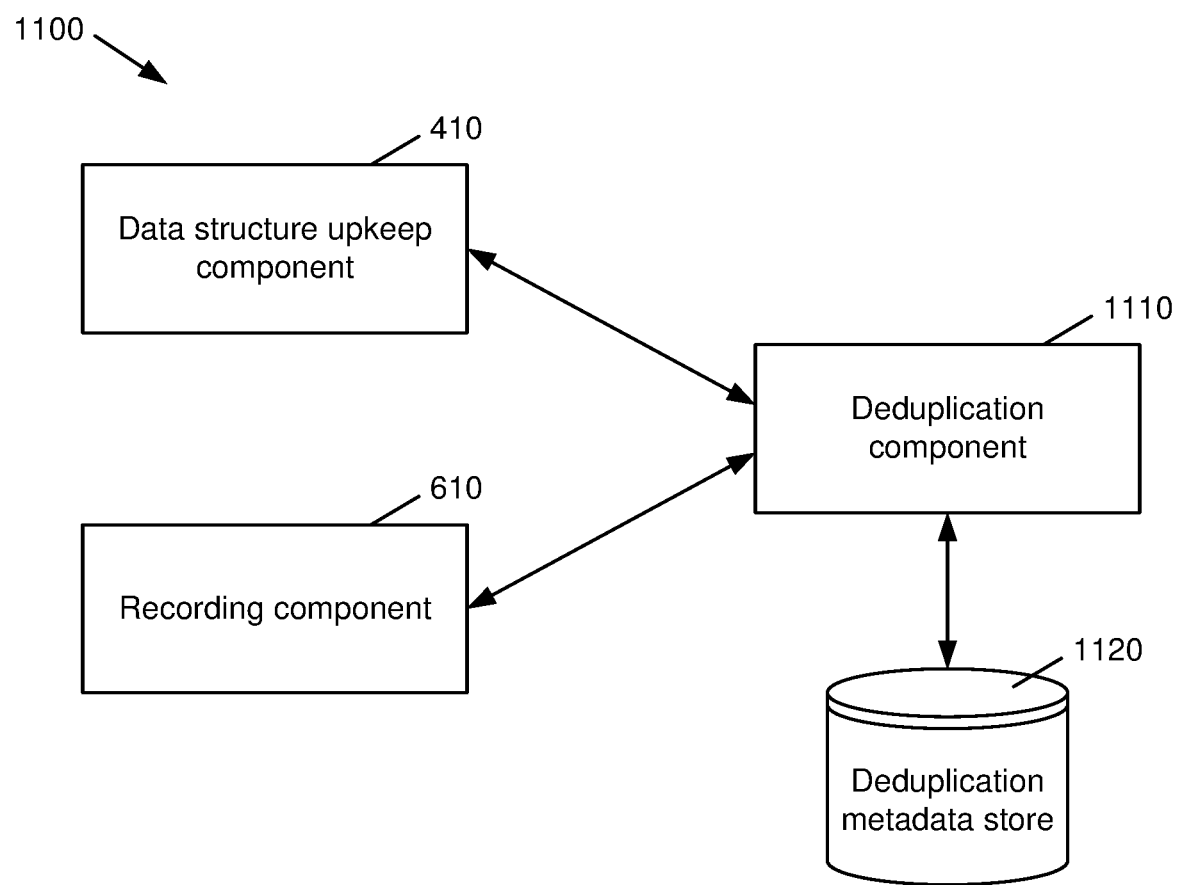
FIG. 11 is a block diagram of a system that facilitates maintenance of file history and/or scan status data in combination with file deduplication data in accordance with various aspects described herein.

With reference next to FIG. 11, a system 1100 that facilitates maintenance of file history and/or scan status data in combination with file deduplication is illustrated. Repetitive descriptions of like parts described in previous embodiments herein is omitted for the sake of brevity. As shown by FIG. 11, system 1100 includes a deduplication component 1110 that can maintain deduplication metadata for respective files stored by an underlying data storage system. Here, the deduplication metadata is stored at a deduplication metadata store 1120, which can be one or more data structures, data storage devices, and/or other means by which deduplication metadata for respective files stored by the data storage system. Other means by which deduplication metadata can be stored could also be used.

In an aspect, the deduplication metadata managed by the deduplication component 1110 can include the scan status data structure 310 as described above. For instance, if file deduplication functionality is present and enabled at a given file storage system, then respective elements of the scan status data structure 310, such as file scan status or the like, can be added to the deduplication metadata via the deduplication component 1110 to act as the scan status data structure 310. As further shown by FIG. 11, one or more other system components, such as a data structure upkeep component 410 and/or a recording component 610, can interact with the deduplication component 1110 to populate file attributes and/or scan status data via techniques that are similar to those described above.

Figure 12:
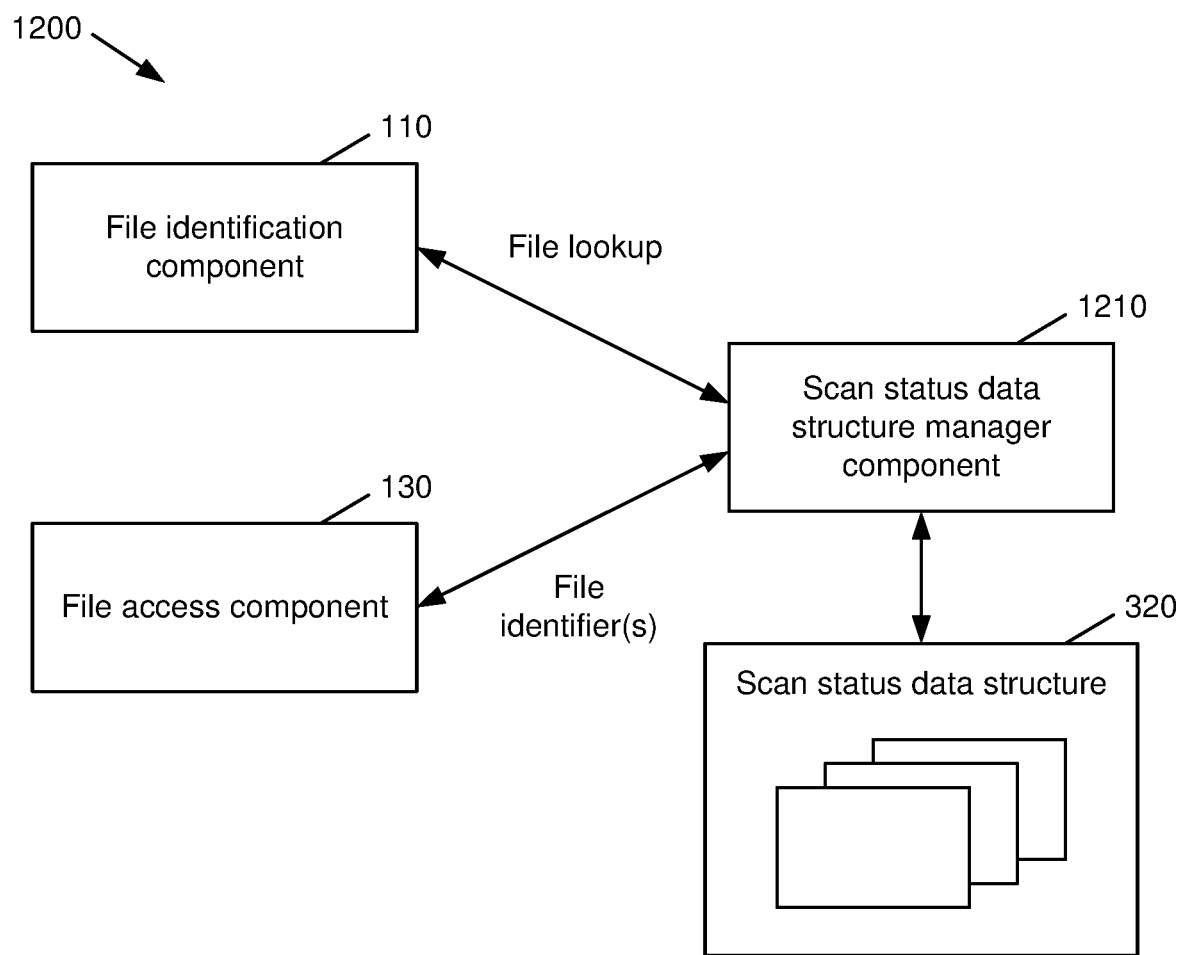
FIG. 12 is a block diagram of a system that facilitates creation and maintenance of a data structure that can be utilized in accordance with various aspects described herein.

Turning to FIG. 12, a system 1200 that facilitates creation and maintenance of a data structure that can be utilized in accordance with various aspects described herein, e.g., the scan status data structure 310, is illustrated. Repetitive descriptions of like parts described in previous embodiments herein is omitted for the sake of brevity. As shown by FIG. 12, system 1200 includes a scan status data structure manager component 1210 that can maintain the scan status data structure 310 in combination with one or more other system components, such as a file identification component 110 and/or a file access component 130, as generally described above.

In an aspect, the scan status data structure manager component 1210 and the scan status data structure 310, can together operate as a FHSST component and/or other scan status management platform. This platform can include, for example, the scan status data structure 310, which stores file identifier, scan status, and/or other information, e.g., on one or more disks, as well as the scan status data structure manager component 1210, which can be implemented via one or more computer programs, algorithms, or the like to create, search, and update the scan status data structure 310. For instance, as shown by FIG. 12, the scan status data structure manager component 1210 can process one or more file identification requests as provided by the file identification component 110 and/or one or more file lookup requests as provided by the file access component 130. Other operations are also possible.

In another aspect, the scan status data structure manager component 1210 and the scan status data structure 310 can be utilized by additional hardware and/or software components in addition to the various components described above. For instance, a file scan statistics reporting program running on a storage device could access information stored at the scan status data structure 310 via the scan status data structure manager component 1210. Other uses of the scan status data structure 310 and scan status data structure manager component 1210 are also possible.

Figure 13:
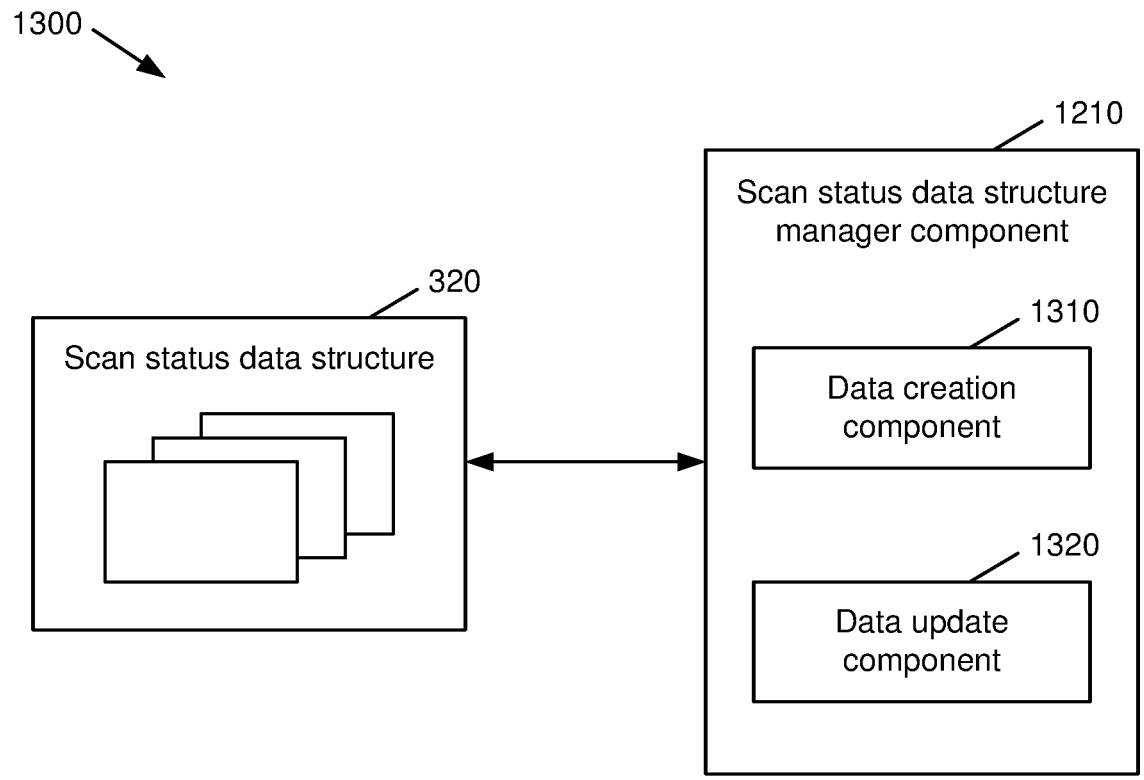
FIG. 13 is a block diagram of a system that facilitates scan status determination for network-attached storage systems in accordance with various aspects described herein.

Turning to FIG. 13, illustrated is a system 1300 that facilitates scan status determination for network-attached storage systems in accordance with various aspects described herein. Repetitive descriptions of like parts described in previous embodiments herein is omitted for the sake of brevity. As shown by FIG. 13, system 1300 includes a scan status data structure 310, which can be configured in accordance with one or more aspects as described above, e.g., in a table format as described above with respect to FIG. 5, as part of deduplication metadata that is maintained as described above with respect to FIG. 11, and/or in any other suitable manner.

As further shown by FIG. 13, system 1300 further includes a scan status data structure manager component 1210 that can be utilized to maintain the scan status data structure 310 via one or more data maintenance procedures. In addition to providing support for improved malware scanning as described above with respect to FIG. 12, the scan status data structure manager component 1210 can additionally maintain the scan status data structure 310 for one or more additional applications, or no applications, based on the operating parameters of an associated NAS system. Various non-limiting examples of additional applications that can be supported via the scan status data structure 310 are described below with respect to FIGS. 15-16.

In an aspect, the scan status data structure manager component 1210 shown in FIG. 13 can include a data creation component that creates a scan status data structure 310 associated with an NAS device. The scan status data structure 310 can include respective records that indicate a file identifier and a malware scan status for respective files stored on the NAS device, as generally described with respect to the preceding embodiments.

Also or alternatively, the scan status data structure manager component 1210 shown in FIG. 13 can include a data update component 1320 that updates a record in the scan status data structure 310 corresponding to a target file stored on the NAS device in response to receiving a malware scan result for the target file, e.g., from an AVS device 220 as generally described above.

Figure 14:
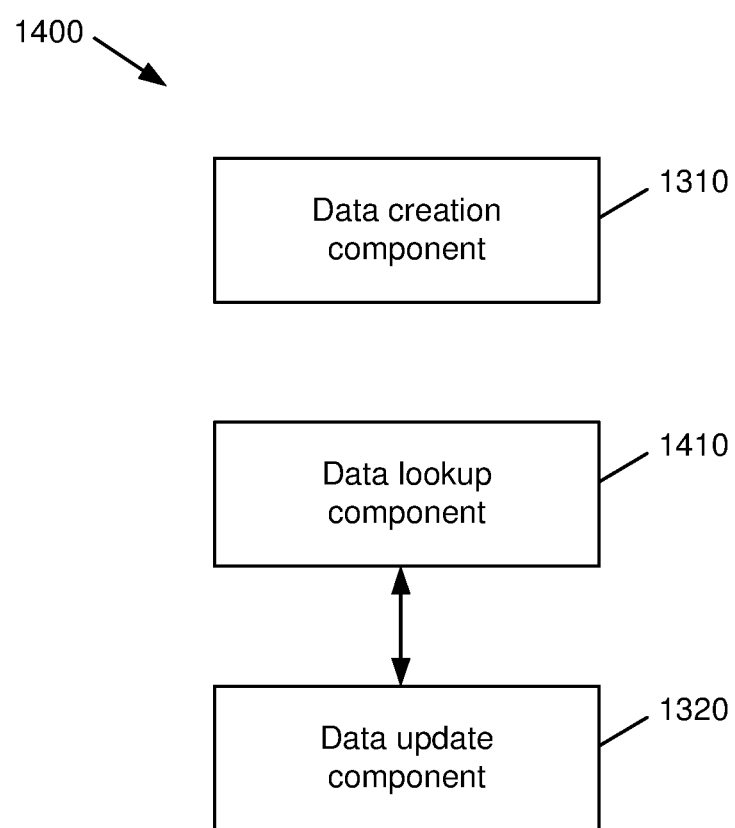
FIG. 14 is a block diagram of a system that facilitates creation, lookup, and update operations for a scan status data structure in accordance with various aspects described herein.
Figure 15:
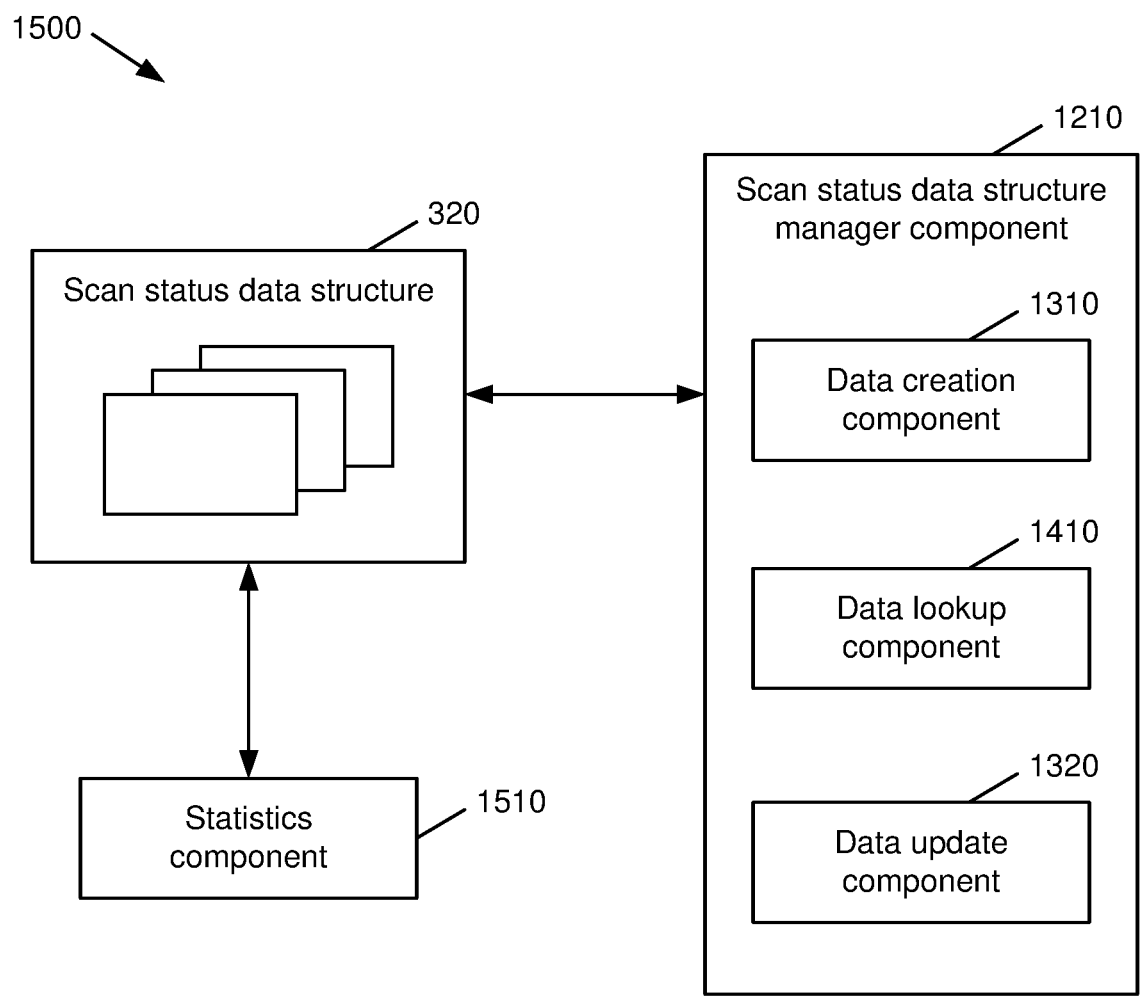
FIG. 15 is a block diagram of a system that facilitates file scan statistics via a scan status data structure in accordance with various aspects described herein.

Turning to FIG. 14, a block diagram of a system 1400 is illustrated that represents respective data maintenance operations that can be performed by the scan status data structure manager component 1210 as shown by system 1300. Here, system 1400 includes a data creation component 1310 and a data update component 1320 as described above with respect to FIG. 13. In addition, system 1400 can include a data lookup component 1410 that obtains an identifier for a target file and determines whether a record corresponding to the identifier for the target file exists in an associated scan status data structure 310 in response to obtaining the identifier.

In an aspect, the data creation component 1310, data lookup component 1410, and data update component 1320 can perform one or more operations to create and/or maintain a scan status data structure 310 as described herein. Specific, non-limiting examples of operations that can be performed by the components 1310, 1320, 1410 of system 1400 are described below. It should be appreciated that other operations in addition to those described below are also possible.

Data Structure Creation:

In an aspect, the data creation component 1310 can perform one or more operations to create a scan status data structure 310 during initialization/startup of the scan status data structure 310. The specific technique(s) utilized by the data creation component 1310 for creating the scan status data structure 310 can vary based on the location of the scan status data structure 310, whether deduplication metadata is present at the desired location of the scan status data structure, and/or other factors.

In an example in which the scan status data structure is to reside on an NAS device, the data creation component 1310 can check whether a deduplication data structure is available at and/or otherwise associated with the NAS device. In response to determining that a deduplication data structure is available, the data creation component 1310 can create the scan status data structure 310 by appending a file scan status field to the existing deduplication data structure.

In contrast, in response to determining that a deduplication data structure is not associated with the NAS device, the data creation component 1310 can create the scan status data structure 310 as a new data structure that includes one or more data fields. These fields can include, but are not limited to, a file identifier field, a file path field, a file size field, a scan status field, or a last scan time field. In an aspect, a data structure created by the data creation component 1310 in this manner can be structured in the manner described above with respect to FIG. 5, and/or in any other suitable manner.

In further examples, the data creation component 1310 can create the scan status data structure 310 as a new data structure in the manner described above at devices other than an NAS device at which deduplication metadata for the NAS device is not available, such as an AVS device 220, a third party server or server cluster, a client device 210, etc.

File Status Lookup:

In an aspect, the data lookup component 1410 can perform one or more operations to look up respective records in the scan status data structure 310 in response to respective file access (e.g., read/write) requests received at an associated NAS device. Lookup operations performed by the data lookup component 1410 can be performed in multiple parts. For instance, the data lookup component can first determine whether a file identifier corresponding to a target file is present in the scan status data structure 310. If the file identifier is present, the data lookup component 1410 can further determine whether a malware scan status for the target file is present in the scan status data structure 310. The results of these operations can subsequently be returned to one or more other components, such as the data update component 1320 as described below.

File Status Update:

In an aspect, the data update component 1320 can perform one or more operations to update respective records in the scan status data structure 310 in response to file scans conducted by an AVS device 220 and/or other suitable triggering events. For updates associated with a given target file, the data update component 1320 can operate in combination with the data lookup component 1410 to determine whether a record for the target file exists in order to perform an appropriate update action. For instance, in response to the data lookup component 1410 determining that an existing record in a scan status data structure 310 for a target file exists, the data update component 1320 can update the existing record corresponding to the target file in response to receiving a malware scan result for the target file. In contrast, in response to the data lookup component 1410 determining that an existing record in the scan status data structure 310 for the target file does not exist, the data update component 1320 can create a new record corresponding to the target file in response to receiving a malware scan result for the target file.

Malware Definition Update:

In another aspect, the data update component 1320 can also update the scan status data structure 310 in response to receiving a malware definition update notification from an AVS device 220 and/or other suitable device(s). For instance, in response to receiving a malware definition update, the data update component 1320 can clear the scan status field for respective file identifiers given in the scan status data structure 310. In an aspect, the data update component 1320 can compare a date associated with a received malware definition update to a stored last update time to determine whether to clear the scan status information in a similar manner to that described above.

In addition to providing increased malware scanning efficiency for NAS systems as described above, a scan status data structure 310 as maintained by a scan status data structure manager component 1210 as described with respect to FIGS. 12-14 can be utilized for respective additional uses. As a first example shown by system 1500 in FIG. 15, the scan status data structure 310 can interface with a statistics component 1510 that can generate statistical reports based on scan status information stored in the scan status data structure 310. The statistics component 1510 can be utilized, e.g., by a file scan statistics reporting program running on a storage appliance associated with the NAS system.

Figure 16:
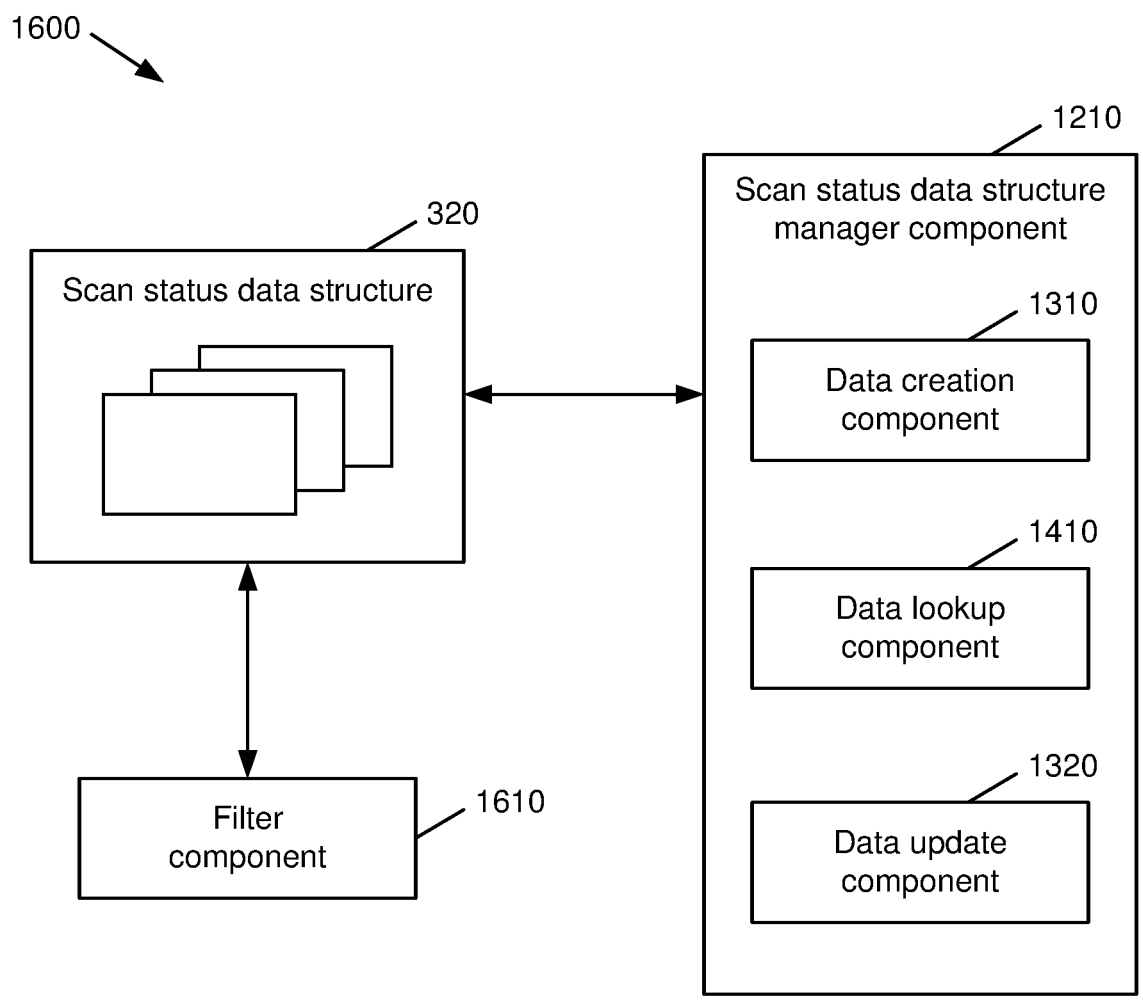
FIG. 16 is a block diagram of a system that facilitates file filtering via a scan status data structure in accordance with various aspects described herein.

As another example shown by system 1600 in FIG. 16, the scan status data structure 310 can interface with a filter component 1610 that classifies respective files represented by the scan status data structure 310 based on scan status information stored in the scan status data structure 310. In one example, the filter component 1610 and the scan status data structure 310 can reside on a device other than an NAS device, and the filter component 1610 can prevent transfer of one or more files that are indicated by the scan status data structure 310 as being infected with malware to the NAS device. For instance, if a client device 210 has access to the scan status data structure 310, the client device 210 can implement the filter component 1610 to filter out infected files at its end without sending those files to the NAS device. In another example, the filter component 1610 can also be used to prevent malware scanning of one or more files that have a previous scan status indicated by the scan status data structure 310, as generally described above. In such an implementation, the filter component 1610 can reside within an antivirus program (e.g., an antivirus program resident on an AVS device 220) and/or any other suitable software programs and/or modules. Other uses of the scan status data structure 310 other than those described above are also possible.

Figure 17:
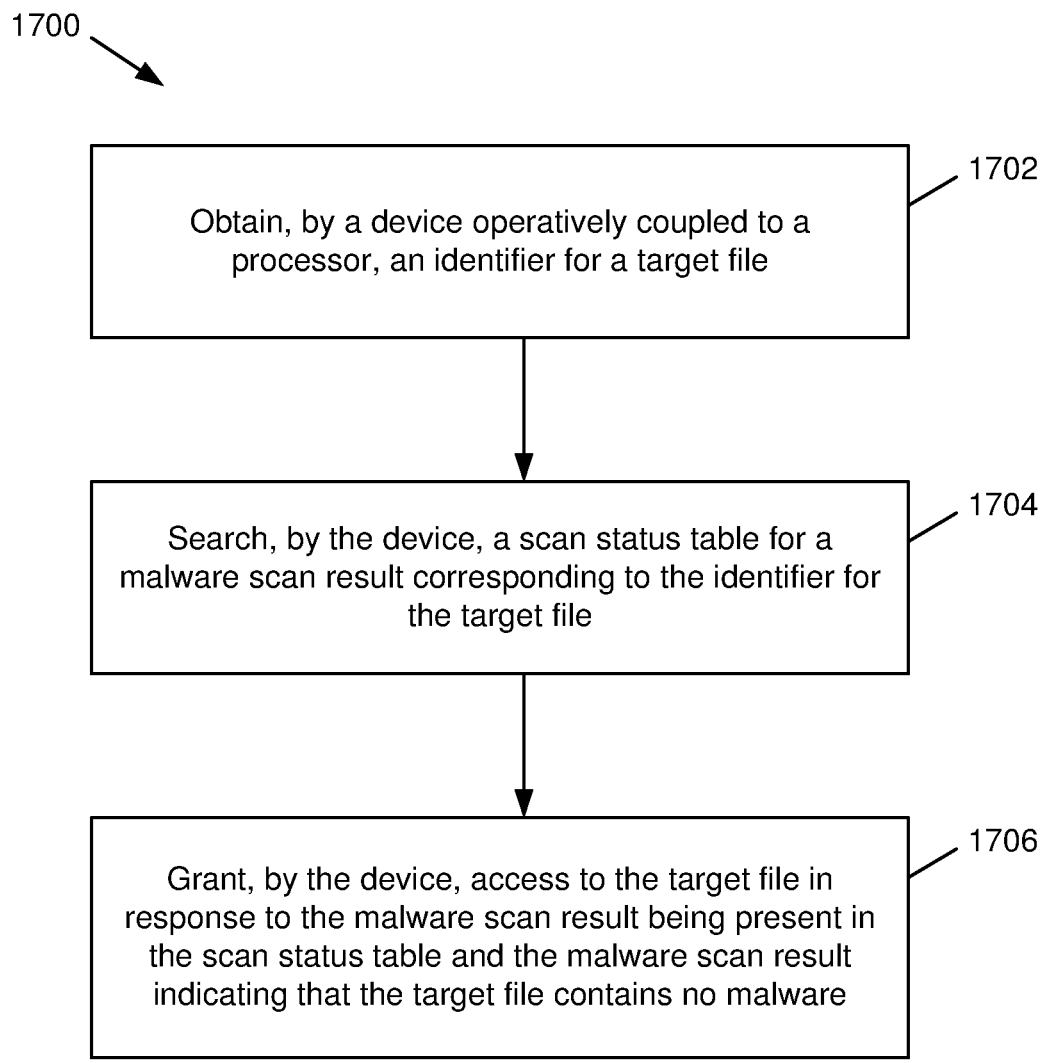
FIG. 17 is a flow diagram of a method that facilitates malware scanning for a network-attached storage system in accordance with various aspects described herein.

With reference to FIG. 17, presented is a flow diagram of a method 1700 for malware scanning for a network-attached storage system according to various embodiments described herein. At 1702, a device operatively coupled to a processor (e.g., an NAS device 102 and/or an AVS 220) can obtain (e.g., via a file identification component 110) an identifier for a target file.

At 1704, the device can search (e.g., via a lookup component 120) a scan status table (e.g., a scan status data structure 310) for a malware scan result corresponding to the identifier for the target file as obtained at 1702.

At 1706, the device can grant (e.g., via a file access component 130) access to the target file in response to the malware scan result being present in the scan status table and the malware scan result indicating that the target file contains no malware.

Figure 18:
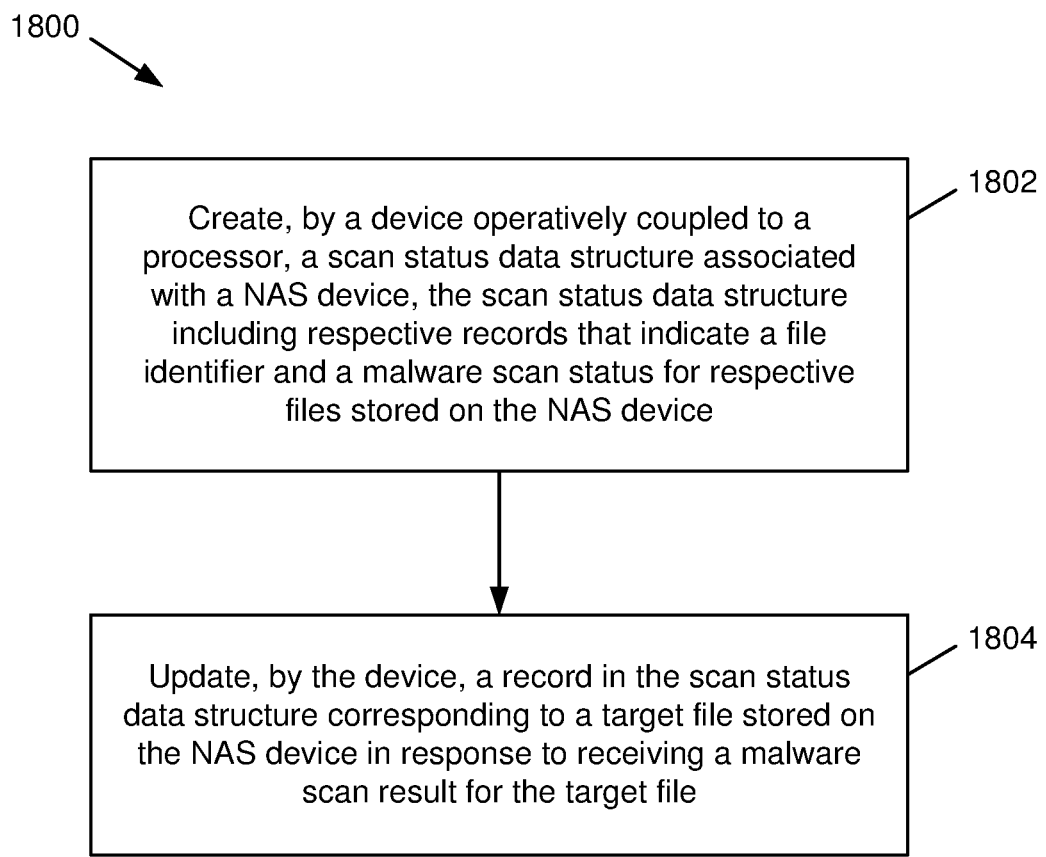
FIG. 18 is a flow diagram of a method that facilitates scan status determination for network-attached storage systems in accordance with various aspects described herein.

With reference next to FIG. 18, presented is a flow diagram 1800 of a method for scan status determination for network-attached storage systems according to various embodiments described herein. At 1802, a device operatively coupled to a processor (e.g., an NAS device 102, a client device 210, an AVS 220, etc.) can create (e.g., via a data creation component 1310) a scan status data structure (e.g., a scan status data structure 310) associated with a NAS device (e.g., the NAS device 102). The scan status data structure can include respective records that indicate a file identifier and a malware scan status for respective files stored on the NAS device.

At 1804, the device can update (e.g., via a data update component 1320) a record in the scan status data structure created at 1802 corresponding to a target file stored on the NAS device in response to receiving a malware scan result for the target file.

FIGS. 7-10 and 17-18 as described above illustrate respective methods in accordance with certain aspects of this disclosure. While, for purposes of simplicity of explanation, the methods have been shown and described as series of acts, it is to be understood and appreciated that this disclosure is not limited by the order of acts, as some acts may occur in different orders and/or concurrently with other acts from that shown and described herein. For example, those skilled in the art will understand and appreciate that methods can alternatively be represented as a series of interrelated states or events, such as in a state diagram. Moreover, not all illustrated acts may be required to implement methods in accordance with certain aspects of this disclosure.

Figure 19:
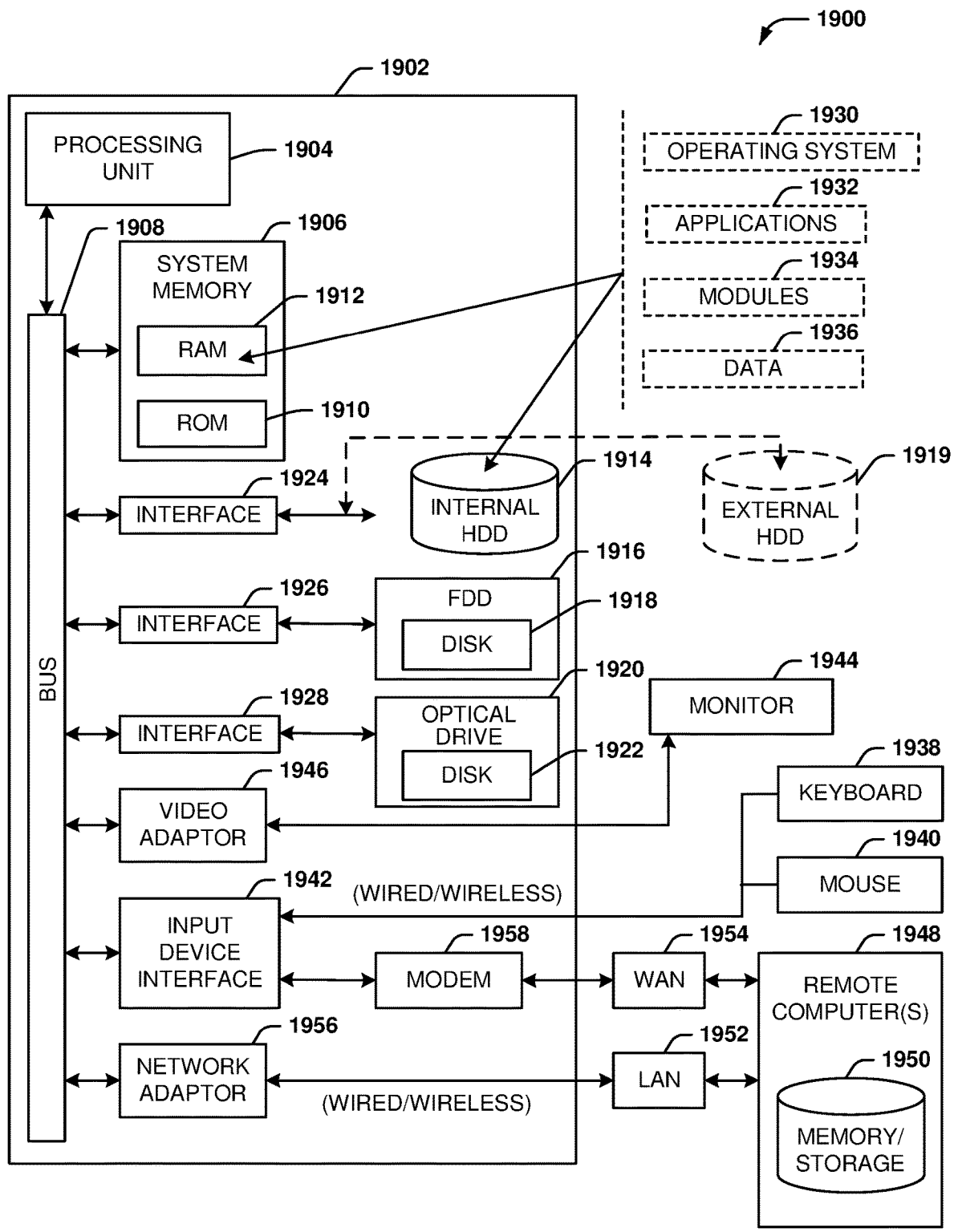
FIG. 19 is a diagram of an example computing environment in which various embodiments described herein can function.

In order to provide additional context for various embodiments described herein, FIG. 19 and the following discussion are intended to provide a brief, general description of a suitable computing environment 1900 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD-ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 19, the example environment 1900 for implementing various embodiments of the aspects described herein includes a computer 1902, the computer 1902 including a processing unit 1904, a system memory 1906 and a system bus 1908. The system bus 1908 couples system components including, but not limited to, the system memory 1906 to the processing unit 1904. The processing unit 1904 can be any of various commercially available processors. Dual microprocessors and other multi-processor architectures can also be employed as the processing unit 1904.

The system bus 1908 can be any of several types of bus structure that can further interconnect to a memory bus (with or without a memory controller), a peripheral bus, and a local bus using any of a variety of commercially available bus architectures. The system memory 1906 includes ROM 1910 and RAM 1912. A basic input/output system (BIOS) can be stored in a non-volatile memory such as ROM, erasable programmable read only memory (EPROM), EEPROM, which BIOS contains the basic routines that help to transfer information between elements within the computer 1902, such as during startup. The RAM 1912 can also include a high-speed RAM such as static RAM for caching data.

The computer 1902 further includes an internal hard disk drive (HDD) 1914 (e.g., EIDE, SATA), a magnetic floppy disk drive (FDD) 1916, (e.g., to read from or write to a removable diskette 1918) and an optical disk drive 1920, (e.g., reading a CD-ROM disk 1922 or, to read from or write to other high capacity optical media such as the DVD). While the internal HDD 1914 is illustrated as located within the computer 1902, the internal HDD 1914 can also be configured for external use in a suitable chassis (not shown). The HDD 1914, magnetic FDD 1916 and optical disk drive 1920 can be connected to the system bus 1908 by an HDD interface 1924, a magnetic disk drive interface 1926 and an optical drive interface 1928, respectively. The interface 1924 for external drive implementations includes at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1902, the drives and storage media accommodate the storage of any data in a suitable digital format. Although the description of computer-readable storage media above refers to an HDD, a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1912, including an operating system 1930, one or more application programs 1932, other program modules 1934 and program data 1936. All or portions of the operating system, applications, modules, and/or data can also be cached in the RAM 1912. The systems and methods described herein can be implemented utilizing various commercially available operating systems or combinations of operating systems.

A user can enter commands and information into the computer 1902 through one or more wired/wireless input devices, e.g., a keyboard 1938 and a pointing device, such as a mouse 1940. Other input devices (not shown) can include a microphone, an infrared (IR) remote control, a joystick, a game pad, a stylus pen, touch screen or the like. These and other input devices are often connected to the processing unit 1904 through an input device interface 1942 that can be coupled to the system bus 1908, but can be connected by other interfaces, such as a parallel port, an IEEE 1394 serial port, a game port, a USB port, an IR interface, etc.

A monitor 1944 or other type of display device can be also connected to the system bus 1908 via an interface, such as a video adapter 1946. In addition to the monitor 1944, a computer typically includes other peripheral output devices (not shown), such as speakers, printers, etc.

The computer 1902 can operate in a networked environment using logical connections via wired and/or wireless communications to one or more remote computers, such as a remote computer(s) 1948. The remote computer(s) 1948 can be a workstation, a server computer, a router, a personal computer, portable computer, microprocessor-based entertainment appliance, a peer device or other common network node, and typically includes many or all of the elements described relative to the computer 1902, although, for purposes of brevity, only a memory/storage device 1950 is illustrated. The logical connections depicted include wired/wireless connectivity to a local area network (LAN) 1952 and/or larger networks, e.g., a wide area network (WAN) 1954. Such LAN and WAN networking environments are commonplace in offices and companies, and facilitate enterprise-wide computer networks, such as intranets, all of which can connect to a global communications network, e.g., the Internet.

When used in a LAN networking environment, the computer 1902 can be connected to the local network 1952 through a wired and/or wireless communication network interface or adapter 1956. The adapter 1956 can facilitate wired or wireless communication to the LAN 1952, which can also include a wireless access point (AP) disposed thereon for communicating with the wireless adapter 1956.

When used in a WAN networking environment, the computer 1902 can include a modem 1958 or can be connected to a communications server on the WAN 1954 or has other means for establishing communications over the WAN 1954, such as by way of the Internet. The modem 1958, which can be internal or external and a wired or wireless device, can be connected to the system bus 1908 via the input device interface 1942. In a networked environment, program modules depicted relative to the computer 1902 or portions thereof, can be stored in the remote memory/storage device 1950. It will be appreciated that the network connections shown are example and other means of establishing a communications link between the computers can be used.

The computer 1902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A data storage system, comprising:
    a memory that stores computer executable components; and
    a processor that executes computer executable components stored in the memory, wherein the computer executable components comprise:
        a data creation component that, in response to determining that a deduplication data structure is not associated with a network attached storage (NAS) device, creates a scan status data structure associated with the NAS device as a new data structure, the scan status data structure comprising respective records that indicate a file identifier and a malware scan status for respective files stored on the NAS device; and
        a data update component that updates a record in the scan status data structure corresponding to a target file stored on the NAS device in response to receiving a malware scan result for the target file.

2. The data storage system of claim 1, wherein the data creation component, in response to determining that a deduplication data structure is associated with the NAS device, creates the scan status data structure by appending a file scan status field to the deduplication data structure.

3. The data storage system of claim 1, wherein the scan status data structure comprises at least one of a file identifier field, a file path field, a file size field, a scan status field, or a last scan time field.

4. The data storage system of claim 1, wherein the computer executable components further comprise:
    a data lookup component that obtains an identifier for the target file and determines whether a record corresponding to the identifier for the target file exists in the scan status data structure in response to obtaining the identifier.

5. The data storage system of claim 4, wherein the data update component, in response to the data lookup component determining that an existing record in the scan status data structure for the target file exists, updates the existing record of the scan status data structure corresponding to the target file in response to receiving the malware scan result for the target file.

6. The data storage system of claim 4, wherein the data update component, in response to the data lookup component determining that an existing record in the scan status data structure for the target file does not exist, creates a new record in the scan status data structure corresponding to the target file in response to receiving the malware scan result for the target file.

7. The data storage system of claim 1, wherein the computer executable components further comprise:
    a statistics component that generates a statistical report based on scan status information stored in the scan status data structure.

8. The data storage system of claim 1, wherein the computer executable components further comprise:
    a filter component that classifies respective ones of the files represented by the scan status data structure based on scan status information stored in the scan status data structure.

9. The data storage system of claim 8, wherein the filter component and the scan status data structure reside on a device that is distinct from the NAS device, and wherein the filter component further prevents transfer of one or more files that are indicated by the scan status data structure as being infected with malware to the NAS device.

10. The data storage system of claim 8, wherein the filter component further prevents malware scanning of one or more files that have a previous scan status indicated by the scan status data structure.

11. A method, comprising:
 creating, by a device operatively coupled to a processor, a scan status data structure associated with a network-attached storage (NAS) device as a new data structure in response to determining that a deduplication data structure is not associated with the NAS device, the scan status data structure comprising respective records that indicate a file identifier and a malware scan status for respective files stored on the NAS device; and
 updating, by the device, a record in the scan status data structure corresponding to a target file stored on the NAS device in response to receiving a malware scan result for the target file.

12. The method of claim 11, wherein the creating comprises:
 creating, in response to determining that a deduplication data structure is associated with the NAS device, the scan status data structure by appending a file scan status field to the deduplication data structure.

13. The method of claim 11, wherein the scan status data structure comprises at least one of a file identifier field, a file path field, a file size field, a scan status field, or a last scan time field.

14. The method of claim 11, further comprising:
 obtaining, by the device, an identifier for the target file; and
 determining, by the device, whether a record corresponding to the identifier for the target file exists in the scan status data structure in response to obtaining the identifier.

15. The method of claim 14, wherein the updating comprises:
 creating, in response to determining that an existing record in the scan status data structure for the target file does not exist, a new record in the scan status data structure corresponding to the target file in response to receiving the malware scan result for the target file.

16. The method of claim 11, further comprising:
 generating, by the device, a statistical report based on scan status information stored in the scan status data structure.

17. The method of claim 11, further comprising:
 classifying, by the device, respective ones of the files represented by the scan status data structure based on scan status information stored in the scan status data structure.

18. A non-transitory machine-readable medium comprising computer executable instructions that, when executed by a processor, facilitate performance of operations, the operations comprising:
 creating a scan status data structure associated with a network-attached storage (NAS) device as a new data structure in response to determining that a deduplication data structure is not associated with the NAS device, the scan status data structure comprising respective records that indicate a file identifier and a malware scan status for respective files stored on the NAS device; and
 updating a record in the scan status data structure corresponding to a target file stored on the NAS device in response to receiving a malware scan result for the target file.

19. The non-transitory machine-readable medium of claim 18, wherein the operations further comprise:
 creating, in response to determining that a deduplication data structure is associated with the NAS device, the scan status data structure by appending a file scan status field to the deduplication data structure.

20. The non-transitory machine-readable medium of claim 18, wherein the scan status data structure comprises at least one of a file identifier field, a file path field, a file size field, a scan status field, or a last scan time field.

* * * * *